(12) United States Patent
Ashida

(10) Patent No.: US 8,828,309 B2
(45) Date of Patent: Sep. 9, 2014

(54) AUTOCLAVE MOLDING METHOD AND AUTOCLAVE MOLDING APPARATUS

(75) Inventor: Takeshi Ashida, Osaka-fu (JP)

(73) Assignee: Kabushiki Kaisha Ashida Seisakusho, Kadoma-shi, Osaka-Fu (JP)

( * ) Notice: Subject to any disclaimer, the term of this patent is extended or adjusted under 35 U.S.C. 154(b) by 191 days.

(21) Appl. No.: 13/246,255

(22) Filed: Sep. 27, 2011

(65) Prior Publication Data

US 2012/0133067 A1 May 31, 2012

(30) Foreign Application Priority Data

Nov. 26, 2010 (JP) ................................ 2010-278599
Jul. 17, 2011 (JP) ................................ 2011-171356

(51) Int. Cl.
 *B29C 35/00* (2006.01)

(52) U.S. Cl.
 USPC .......................... 264/544; 264/40.3; 264/257

(58) Field of Classification Search
 CPC .................................................. B29C 35/0227
 USPC ........................................ 264/544, 40.3, 257
 See application file for complete search history.

(56) References Cited

U.S. PATENT DOCUMENTS

| 7,335,012 B2 * | 2/2008 | Blanton et al. ................ 425/388 |
| 2009/0256290 A1 | 10/2009 | Wernestrom | |

FOREIGN PATENT DOCUMENTS

| GB | 654 289 A | 6/1951 |
| JP | 57 051422 A | 3/1982 |
| JP | 61 173911 A | 8/1986 |
| JP | 61 290036 | 12/1986 |

OTHER PUBLICATIONS

Astell, "Guide to Autoclaves", Accessed on Apr. 27, 2013 at http://www.groco.is/groco/upload/files/skrar_i_frodleikur/guide_to_autoclaves.pdf.*
Miracle D B et al: "Curing", Jan. 1, 2001, ASM Handbook—Composites, ASM International Materials Park, Ohio, USA, pp. 486-491, XP002563889, ISBN: 978-0-87170-703-01.
Campbell F C Ed—Campbell Flake C: "Chapter 6: Curing: It's a Matter of Time (t), Temperature (T) and Pressure (P)", Jan. 1, 2004, Manufacturing Processes for Advanced Composites, Elsevier Advanced Technoloy, Oxford, GB, pp. 175-221, XP002606673, ISBN: 978-1-85617-415-2.

* cited by examiner

*Primary Examiner* — Alison Hindenlang
(74) *Attorney, Agent, or Firm* — Lucas & Mercanti, LLP

(57) ABSTRACT

The composite material formed of a fiber substrate and a matrix is placed in a vacuum bag and then in the molding chamber. Saturated steam of a predetermined temperature needed for the composite material is supplied to the molding chamber, and the temperature and the pressure inside the molding chamber are controlled so that the inside of the molding chamber may be maintained at a predetermined temperature and a predetermined pressure needed for the composite material in order to carry out a curing step.

1 Claim, 15 Drawing Sheets

AUTOCLAVE MOLDING METHOD AND AUTOCLAVE MOLDING APPARATUS

FIELD OF ART

This invention relates to an autoclave molding method and an autoclave molding apparatus for a composite material molded product used in aircraft, automobile and other general industries.

BACKGROUND OF THE INVENTION

A molded product having an intended cross sectional shape has been conventionally obtained by the known method that a sheet-like composite material, namely, a prepreg manufactured by impregnating a reinforcing material like a carbon fiber, an aramid fiber or a glass fiber with a thermo-setting resin called matrix like an epoxy resin or a phenol resin, is heated and pressure-formed.

These fibers are formed into plate-like fiber layers. A plurality of the fiber layers are laminated to form the composite material in a manner that the fibers of the layers are arranged in different directions. By doing so, a lightweight and strong product can be obtained since the carbon fiber, the glass fiber etc. have high coefficient of elasticity, and the product is widely used in aircraft, automobile and other general industries.

The composite material including the thermosetting resin as the matrix has the behavior that it is soft at ambient temperatures and is cured reactively by heating to a predetermined temperature.

One of the technologies for molding the composite material is the technology in which a hot-press apparatus is used. According to this technology, the composite material is placed between an upper metal mold and a lower metal mold in a sandwiching manner as shown in FIG. 14. The composite material is then heated and pressurized based on a pattern graph of FIG. 15 for controlling the temperature and pressure over the time course. When the resin is finished curing, a molded product having a predetermined cross sectional shape is obtained as shown in FIG. 14. The metal molds generally have electric heaters or dedicated coils therein to heat a material. The metal molds are heated by heat conduction or electromagnetic induction, and the heat is used for molding.

The composite material is formed of a carbon fiber, an aramid fiber or the like, and the resin called matrix as mentioned above. Taking an epoxy resin for instance, when it is heated to around 90-100° C. at which viscosity of the resin becomes the lowest, the resin having viscoelasticity at an ambient temperature reaches a softening point and the fluidity is increased. By maintaining the temperature, the air contained in the material and the air confined between the laminated layers go out and a hollow called a void is not left in the product. This step is called a dwell step.

After this step is finished, the composite material is continuously heated to a predetermined temperature, and at the same time, pressurization is started to obtain a predetermined pressure. The pressure is increased so that it may reach a predetermined pressure a little before the predetermined temperature is obtained, and the predetermined temperature and pressure are maintained. Curing starts at the predetermined temperature, and the temperature is maintained until curing is completed. Normally, the curing is completed in about an hour. The speed of temperature rising varies depending on a total thickness of the laminated material. To be specific, the thicker the material is, the slower the temperature rises. When the temperature rises quickly upon heating the material, variation in temperature is caused, and therefore variation in curing state is caused. Furthermore, the variation in curing state may cause fracture due to lack of strength. The speed of temperature rise is determined based on experience, experiments, etc. As for the speed of pressure rise, it is only necessary to raise the pressure so that the pressure curve reaches the predetermined pressure a little before the temperature reaches the predetermined temperature.

The above-mentioned pressure profile is only an example in which the pressure starts rising after the dwell step. However, pressure may be raised at the same time as the dwell step or before the step. Further, the dwell step itself may be omitted.

A molded product of a composite material of this kind can also be obtained by an autoclave molding method in addition to the above-mentioned method using the hot-press apparatus.

According to the autoclave molding method, the composite material is placed in a molding chamber. Then, pressurized air, nitrogen, or mixed gas of these is supplied, and the composite material is heated to a predetermined temperature by a heating means and is pressurized for molding.

In this occasion, the heated air is circulated in the molding chamber so that the heat is evenly applied to the composite material.

The following documents are listed as conventional technologies related to the above-mentioned hot-press apparatus and the autoclave molding method.

(Document 1) Unexamined Patent Publication No. 2010-115822

(Document 2) Unexamined Patent Publication No. 2006-88049

(Document 3) Unexamined Patent Publication No. 2009-51074

According to the molding method using the above-mentioned hot-press apparatus, since the composite material is molded by surface pressure applied in one direction by the upper metal mold and the lower metal mold, no pressure is applied to the faces perpendicular to the surface pressure. Consequently, density of the composite material in the direction perpendicular to the direction of the surface pressure is insufficient and an inherent strength can not be obtained, which constitutes a problem. In a product having an uneven and complicated cross section, the problem is more conspicuous. When a composite material molded product including different cross sections is to be formed by using the hot-press apparatus, unified molding is difficult and therefore a plurality of members have to be bonded together, making the process complicated. Further, in the case of the hot-press apparatus, since electric heaters and dedicated coils have to be arranged in the upper and lower metal molds, the metal molds themselves become expensive. Furthermore, since the metal molds are required to have fatigue strength and robustness against pressure, they are easy to become large and heavy, which also constitutes a problem in the cost of the metal molds.

On the other hand, an autoclave molding method is suitable for molding a product having a complicated cross sectional shape. However, there are various problems in heating and pressurizing.

Heated air or nitrogen is generally used to supply heat to the composite material. The composite material is placed in a vacuum bag and then placed in a molding chamber, and heat needs to be applied evenly to the composite material by heated air or other gases. For that purpose, it is necessary to arrange a circulation means like an electric motor and a fan for circulating the heated air, and a heating means like a heater for continuous supply of heat. This makes the apparatus large and requires control of the apparatus.

The air, nitrogen or mixed gas of these used in the autoclave molding method like the abovementioned has less heat conductivity compared to that of a metal like the metal mold. Therefore, the gas serves as a heat insulating material. In addition, the temperature rising ratio of the composite material is small partly because the gas has lower heat capacity per unit flow. Further, it is necessary to circulate the gas with preferable flow to allow the heated gas to come into contact with the composite material evenly, which has been difficult.

SUMMARY OF THE INVENTION

The purpose of this invention is to improve the autoclave molding method in the field of composite materials, and to provide an efficient molding method of a composite material. Namely, by mainly using saturated steam, which has never been used in a conventional autoclave molding method in the field of the composite materials, large quantity of heat can be evenly applied to the product to be molded or the composite material having a complicated cross sectional shape. Further, the pressure and the temperature for molding can be easily controlled without arranging a heating means or a gas/air circulating means in the molding chamber. By improving the temperature rising ratio to resolve uneven temperatures, a temperature rising time, a curing time and consequently a production lead time are considerably shortened.

The autoclave molding method of this invention includes a step of placing the composite material formed of a fiber substrate and a matrix in a vacuum bag, and then placing the same in the molding chamber, and a step of supplying heat and pressure for molding. To solve the above-mentioned problems, saturated steam having a predetermined temperature needed for the composite material is supplied to the molding chamber as a heat source and a predetermined pressurization source. At least either the temperature or the pressure in the molding chamber is controlled so that the inside of the molding chamber is maintained to have the predetermined temperature and the pressure required for the composite material to carry out curing.

The autoclave molding apparatus of this invention is the apparatus for placing the composite material formed of the fiber substrate and the matrix in the vacuum bag, placing it in the molding chamber 1, and then supplying heat and pressure for molding. To solve the above-mentioned problems, the autoclave molding apparatus comprises a saturated steam supplying means as a heat source and a predetermined pressurization source for supplying the saturated steam having a predetermined temperature needed for the composite material 13 to the molding chamber, and a control means for controlling supply of the saturated steam to maintain the inside of the molding chamber at the predetermined temperature and pressure needed for the composite material 13.

In this invention, when the water and steam is in a balanced state under a predetermined pressure, the steam is referred to as saturated steam of the water. The pressure of the steam in this state is referred to as a saturated steam pressure or a maximum steam pressure of the water. In other words, the pressure of the saturated steam is determined by the temperature. For example, when the temperature is 130° C., the pressure is 0.3 MPa. An absolute pressure is indicated here.

In this invention, the fiber substrate can be any fiber like a carbon fiber, an aramid fiber, a glass fiber or the like which has been used in a composite material. Further, the thermosetting resin can be any of an epoxy resin, a phenol resin or the like which has been used in this kind of composite material.

In this invention, matrix is a technical term used in the field of composite material to indicate a thermosetting resin or a thermoplastic resin. The thermosetting resin includes an epoxy resin (EP), a phenol resin (PF), an unsaturated polyester resin (UP) and the like. The thermoplastic resin includes a polypropylene resin (PP), a polyamide resin (PA), an ABS resin (ABS) and the like.

Further, the composite material includes the fiber substrate injected with the matrix, coated with the same, or laminated with the same, in addition to the fiber substrate impregnated with the matrix.

The above-mentioned vacuum bag may be the one made of a material like nylon, polyimide, etc. which are known in this kind of autoclave molding, and needless to say, it is sufficient when the material is heat resistant and water resistant.

In the method according this invention, saturated steam is used which has never been considered to be used in a conventional autoclave in the field of composite material. Heat and pressure can be evenly applied to the product to be molded or the composite material having a complicated cross sectional shape, which is placed in a steam-resistant vacuum bag, by using the predetermined pressure and temperature of the saturated steam and by effectively using a large quantity of heat of the saturated steam, without arranging a heating means or a gas/air circulating means in the molding chamber. Further, uneven manufacturing like partial strength poverty in the molded product can be prevented.

Moreover, as the large quantity of heat attributed to the saturated steam is supplied, unevenness in the temperature inside the molding chamber is hardly caused, and the curing time of the composite material can be considerably reduced, which are remarkable advantages. In addition, there is an advantage that this invention can be materialized only by modifying an existing autoclave.

Though the apparatus of this invention needs to have a saturated steam supplying means etc., it is not necessary to arrange a heater and a gas circulation means like a fan, a current plate or an inductive plate in the molding chamber as in the conventional technology. Consequently, the cost of equipment of the apparatus is reduced. Further, since the saturated steam is supplied, heat and pressure can be evenly applied to the composite material only by filling the molding chamber with the saturated steam without rectifying the air current in the molding chamber, which is another advantage.

Other advantages of the invention will be made clear in the following description of the embodiments of the invention.

PREFERRED MODES OF THE INVENTION

The autoclave molding method of this invention is preferably embodied as follows.

Namely, as a supplemental pressurizing source needed for molding, the air, nitrogen, or the mixed gas of these having a predetermined pressure higher than the saturated steam pressure is supplied to the molding chamber. Supply of the saturated steam, and the air, nitrogen or the mixed gas of these having the predetermined pressure is controlled, and at least one of the temperature or the pressure is controlled so that the predetermined temperature and pressure in the molding chamber needed for the composite material can be maintained to carry out a curing process.

Thus, by adding the supplemental air, nitrogen or the mixed gas of these having the predetermined pressure, control of the pressure and the temperature for molding is facilitated.

In the meantime, the air, nitrogen or the mixed gas of these having the predetermined pressure used as the supplemental pressurization source may have an ambient temperature, or may be preheated to a predetermined temperature. When the mixed gas is used, the ratio of mixture can be determined arbitrarily.

The saturated steam having the predetermined pressure needed for the composite material is heated to obtain superheated steam of a predetermined temperature higher than that of the saturated steam to allow the superheated steam to serve as the heat source and the predetermined pressurization source. The superheated steam is supplied to the molding chamber. It is preferable that the curing process is carried out by controlling at least either of the temperature or the pressure in the molding chamber so that the predetermined temperature and pressure needed for the composite material can be maintained.

Thus, by using the superheated steam obtained by heating the saturated steam, the heat quantity of a lower-side pressure range lower than the saturated steam pressure is compensated. Consequently, a full range of pressure and temperature can be controlled. In addition, by supplying a large quantity of heat attributed to the superheated steam, uneven temperature in the molding chamber is hardly caused, and the curing time of the composite material can be considerably shortened. Further, this invention can be materialized only by modifying an existing autoclave, which is another advantage.

In the meantime, saturated steam generally contains a very little water, and it is called wet saturated steam or wet steam. When dry saturated steam of X kg and water of (1-X) kg is contained in the wet steam of 1 kg, X is referred to as a dryness fraction, and (1-X) is referred to as a wetness fraction. When the dry saturated steam is further heated, the temperature rises. Thus, the steam having the temperature higher than the temperature corresponding to the saturated steam pressure is referred to as superheated steam. While the saturated steam gives off white steam, the superheated steam is a clear and colorless gas, and it does not build up condensation before the temperature comes down to a saturation temperature. When the superheated steam is blown over a substance, the surface temperature rises, and the water contained in the substance evaporates. This behavior is utilized in a dryer, a cooker, etc. because of these properties.

The superheated steam used in this invention can be obtained by heating the saturated steam of 100° C. and 0.1 MPaG, namely, a standard pressure or an atmospheric pressure 130° C. and to have 0.1 MPaG.

Preferable process is described below. Namely, only the saturated steam is supplied with the molding chamber partly opened to heat the molding chamber to a predetermined temperature, and the state is maintained for a predetermined time to carry out the dwell step. After that, the molding chamber is closed tightly, and the saturated steam and the air, nitrogen or the mixed gas of these having the predetermined pressure is supplied. Then, the process is shifted from the pressure raising step to a curing step.

It is preferable that after the curing step of the matrix is completed, cooling water is supplied into the molding chamber to cool the composite material. Then, the composite material is transferred to a drying chamber and the air is supplied. After drying, the composite material is released from the vacuum bag.

The autoclave molding apparatus of this invention is preferably materialized as follows.

Namely, a compressed air supplying means 33 is arranged as a supplemental pressurizing source to supply to the molding chamber the air, nitrogen or the mixed gas of these having a predetermined pressure higher than the saturated steam pressure needed for molding. Thus, the air, nitrogen or the mixed gas of these having the predetermined pressure can be added for supplementation. Consequently, control of the pressure and temperature for molding is facilitated.

Further, as the heat source and a predetermined pressurization source, it is preferable that a superheated steam supplying means 36 including a saturated steam heating means 35 for heating the saturated steam having the predetermined pressure needed for the composite material 13 is arranged. The superheated steam supplying means 36 heats the saturated steam to turn it into the superheated steam having the predetermined temperature higher than that of the saturated steam, and then supplies the superheated steam to the molding chamber.

Thus, the heat quantity of a lower-side pressure range lower than the saturated steam pressure is compensated. Consequently, a full range of pressure and temperature can be controlled. In addition, by supplying the large quantity of heat attributed to the superheated steam, uneven temperature in the molding chamber is hardly caused, and the curing time of the composite material can be considerably shortened, which is a conspicuous advantage. Further, this invention can be materialized only by modifying an existing autoclave apparatus, which is also an advantage.

It is preferable to have the structure as follows. Namely, a pressure reduction valve 23 for steam is arranged in the saturated steam supplying means 32 to obtain an intended pressure. The automatic main steam valve 24 and the automatic temperature control valve 25 are connected in parallel to each other. The pressure reduction valve 23, the automatic main steam valve 24 and the automatic temperature control valve 25 are controlled by the control means 34.

By arranging these valves, the temperature and the pressure in the molding chamber 1 is easily controlled individually, facilitating the control as a whole.

It is preferable that a plurality of nozzles 7 for supplying the saturated steam into the molding chamber 1 are arranged so that they can inject the saturated steam to the substantially entire composite material 13, and that the nozzles 7 can also serve as nozzles for supplying the air, nitrogen or the mixed gas of these having a predetermined pressure.

With this structure of using the nozzles for the above-mentioned double purposes, heat supply destinations and pressure supply destinations are made to be identical, which simplifies the structure and reduces uneven distribution of the pressure and temperature.

PREFERRED EMBODIMENTS OF THE INVENTION

Embodiment 1

Preferred embodiments of the autoclave molding method and the apparatus for the method of this invention are described in detail hereinafter based on the drawings. In the first embodiment, a thermosetting resin is used as the matrix.

Figure 1:
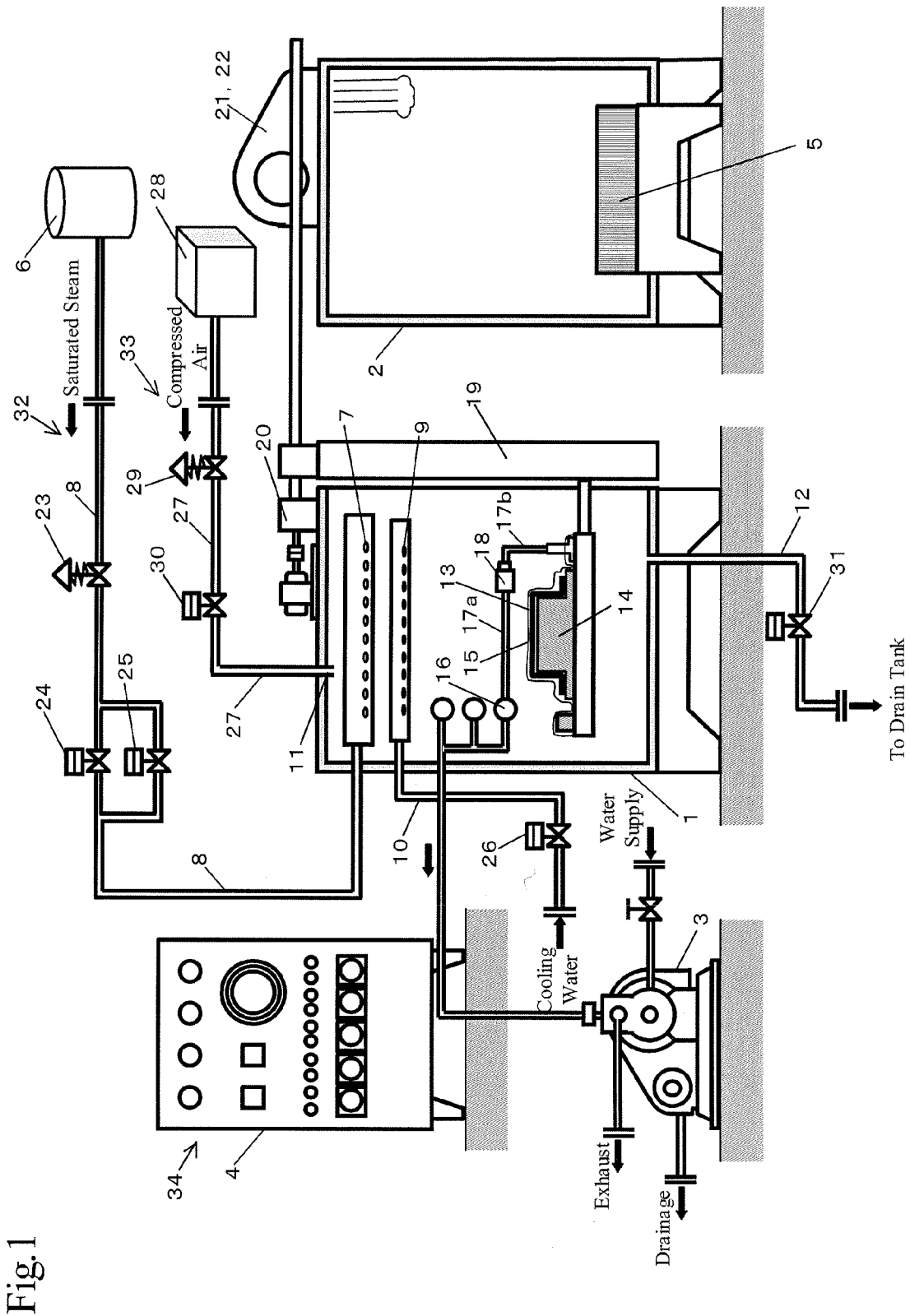
FIG. 1 is a schematic view of the whole autoclave apparatus of the Embodiment 1 of this invention.
Figure 2:
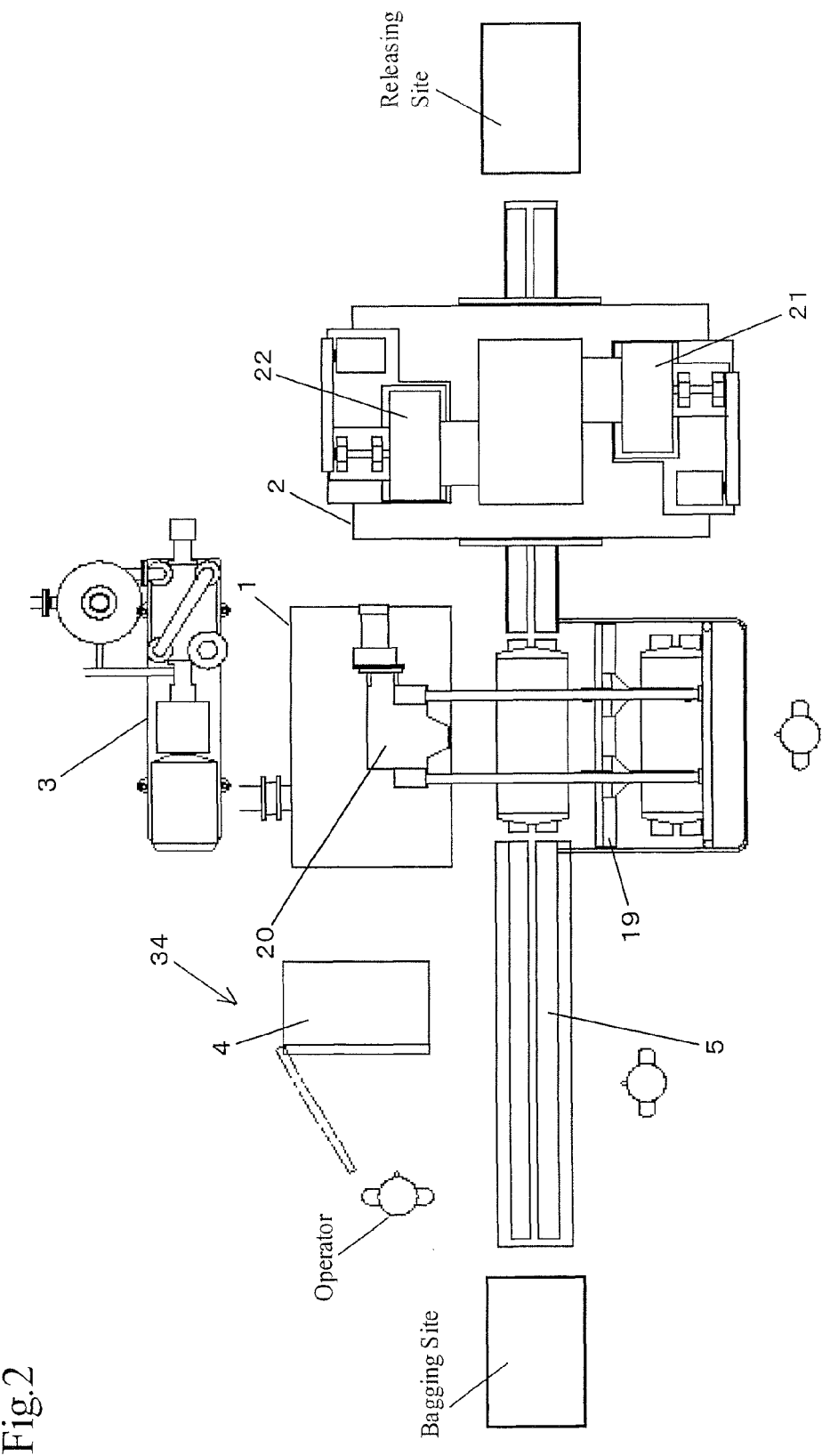
FIG. 2 is a schematic plan view of a main part of the autoclave apparatus of the Embodiment 1.

A schematic structure is shown in FIGS. 1 and 2 to show the whole autoclave apparatus of this invention.

The apparatus mainly comprises a molding chamber 1, a drying chamber 2, a water ring vacuum pump 3, a control panel 4, an automatic conveying line 5, namely, a conveyor, a boiler 6, pipes connected thereto, and a plurality of valves. Detailed structure of these will be described below.

Namely, the autoclave molding apparatus is to form a composite material 13 by placing the same in a vacuum bag 15 and then in the molding chamber 1, and heating and pressurizing the same. The composite material 13 is obtained by impregnating a fiber substrate, namely, a carbon fiber in this embodiment, with a thermosetting resin, namely, an epoxy resin in this embodiment, as a matrix. The autoclave molding apparatus comprises a saturated steam supplying means 32, a compressed air supplying means 33, and a control means 34. The saturated steam supplying means 32 serves as a heat and predetermined pressurization source to supply to the molding chamber 1 the saturated steam having the predetermined temperature needed for the composite material 13, which is 130° C. in this embodiment. The compressed air supplying means 33 supplies to the molding chamber 1 the air, nitrogen or a mixed gas of these having a predetermined pressure, which is 0.31 MPaG in this embodiment, as a supplemental pressurization source needed for molding. MPaG is a unit to indicate a gauge pressure, namely, a differential pressure to the atmospheric pressure. The control means 34 controls supply of the saturated steam, and the air, nitrogen or the mixed gas of these having a predetermined pressure so that the inside of the molding chamber can be maintained at the predetermined temperature, which is 130° C. in this embodiment, and the predetermined pressure, which is 0.3 MPaG in this embodiment needed for the composite material 13.

The saturated steam supplying means 32 is provided with a pressure reduction valve 23 to turn the pressure of live steam, which is boiled by the boiler 6 and has 0.4 MPaG and 150° C. in this embodiment, into an intended pressure of 0.2 MPaG in this embodiment. Further, the saturated steam supplying means 32 is provided with an automatic main steam valve 24 and an automatic temperature control valve 25 which are connected in parallel to each other. The pressure reduction valve 23, the automatic main steam valve 24 and the automatic temperature control valve 25 are controlled by the control means 34.

A plurality of nozzles 7, namely, 20 nozzles/row 2 rows=40 nozzles in this embodiment, for supplying the saturated steam into the molding chamber 1 are arranged so that the nozzles 7 can inject the saturated steam to the substantially entire composite material 13. The nozzles 7 may also serve as nozzles for supplying the air, nitrogen or the mixed gas of these having the predetermined pressure, which will be described later as an example of modification of this invention.

A specific structure of the autoclave apparatus will be described in detail hereinafter.

The molding chamber 1 is provided with a steam pipe 8 having a plurality of steam nozzles 7, namely, 40 nozzles in this embodiment, in a manner that the saturated steam coming from the boiler 6 and injected into the molding chamber 1 may wholly cover the inside of the molding chamber 1. Further, a cooling pipe 10 is provided with a plurality of cooling nozzles 9 which opens so as to wholly cover the inside of the molding chamber 1 as in the case of the steam pipe 8 having the steam nozzles 7. An air nozzle 11 opening to inject the compressed air into the molding chamber 1 is also arranged. The boiler 6, the steam pipe 8, and the steam nozzles 7 comprise the saturated steam supplying means 32.

A drainage pipe 12 is arranged to drain condensed moisture and the cooling water accumulating in a bottom part of the molding chamber 1. A vacuum nozzle 16 is arranged to vacuum the composite material 13 which is laid on a mold form 14, wrapped in the vacuum bag 15 together with the mold form 14, and preliminarily vacuumed. A vacuum coupler 18 is arranged to connect a flexible hose 17a connected to the vacuum nozzle 16 with the vacuum bag 15. Further, a door 19 for tightly closing the molding chamber 1, and an opening and closing device 20 for the door 19 are also arranged.

In this embodiment, the composite material 13 is a layered object of a carbon fiber, and an epoxy resin is used as the thermosetting resin, however, a phenol resin etc. can also be used.

A constituent material of the vacuum bag 15 is nylon in this embodiment, however, a material having heat resistance and water resistance like a silicone rubber can also be used.

In this embodiment, a constituent material of the mold form 14 is FRP, however, various materials like a pearl board, gypsum, etc. can also be used, since a need for a built-in heat source, which has to be arranged in a metal mold used in a hot-press apparatus, is eliminated, and the thickness and the strength of the mold form 14 of this invention can be a requisite minimum as far as the mold form 14 can resist the saturated steam and the compressed air.

Blowers 21, 22 for heating the inside of a drying chamber 2 is arranged on the outside of a drying chamber 2. The drying chamber 2 has a space sufficient for housing the vacuum bag 15 conveyed by an automatic conveying line 5.

The water ring vacuum pump 3 performs intake, compression and exhaust by rotating a bladed wheel by seal water. Unlike an oil circulation type vacuum pump, the water ring vacuum pump 3 does not allow oil to run on a pipe for vacuuming, and consequently does not smear the inside of the molding chamber 1.

The control means 34 comprises the control panel 4. The control panel 4 is an operation panel to control the process for automatic conveyance of the vacuum bag 15 and for molding like adjustment etc. of supply of saturated steam and compressed air, which will be described later. In addition to the control panel 4, the control means 34 further comprises: the reduction valve 23, the automatic main steam valve 24 and the automatic temperature control valve 25 for controlling the steam as above-mentioned; a pressure reduction valve 29 for the compressed air and an automatic air introducing valve 30 for controlling the compressed air; and an operation mechanism including the door opening/closing device 20, an automatic cooling water introduction valve 26, an automatic drainage valve 31, the vacuum pump 3, etc.

The automatic conveying line 5 is to automatically convey the composite material 13, which is layered on the mold form 14, wrapped with the vacuum bag 15 and preliminarily vacuumed off-line, into and out of the molding chamber 1 and the drying chamber 2 on-line, and to automatically convey it to the site, which is not shown in Figs., where the vacuum bag 15 is removed and the molded product is released from the mold.

Now, piping including valves is explained.

The steam pipe 8 leading to the pipe having a plurality of steam nozzles 7 is explained below from the upstream side thereof. The steam pipe 8 for sending the saturated steam boiled by a boiler 6 leads from a flange connecting the pipe from the boiler 6 to the pressure reduction valve 23 which reduces the pressure of the steam with respect to an original pressure. Then, the steam quantity is controlled. From the pressure reduction valve 23, the automatic main steam valve 24 mainly serving to raise the temperature and the automatic temperature control valve 25 mainly serving to maintain the predetermined temperature are connected in parallel to each other, from where the steam pipe 8 extends to the part having the steam nozzles 7.

The cooling pipe 10 leading to the pipe having a plurality of cooling nozzles 9 is the pipe to convey cooling water from a water tank, which is not shown in the drawings. The cooling pipe 10 is connected from a flange connecting the pipe coming from the water tank to an automatic cooling water introducing valve 26 controlling the water quantity, and leads to the part having the cooling nozzles 9.

An air pipe 27 leading to the part having the air nozzle 11 is the pipe to send the compressed air from a compressor 28. The air pipe 27 leads from a flange connecting the pipe coming from the compressor 28; to the pressure reduction valve 29 for reducing the air pressure with respect to the original pressure; then to the automatic air introducing valve 30 for controlling the air quantity; and further to the part having the air nozzle 11. The compressor 28, the air pipe 27, and the air nozzle 11 comprise the compressed air supplying means 33. In the meantime, though nitrogen alone may be used instead of the compressed air, the means is referred to as a compressed air supplying means for the sake of convenience.

In the drainage pipe 12, a drainage port is arranged at the bottom of the molding chamber 1 to drain the condensed moisture or cooling water accumulating at the bottom of the molding chamber 1, from where the pipe 12 extends downward, to which an automatic drainage valve 31 is connected, and then leads to a drainage tank which is not shown in the drawing. The automatic drainage valve 31 also serves to release the pressure in the molding chamber 1, in other words, it also has a function of exhaust.

A vacuum line leading to the vacuum nozzle 16 is arranged in a manner that the water ring vacuum pump 3 is connected to the vacuum nozzle 16 arranged in the molding chamber 1. The water ring vacuum pump 3 performs intake, compression and exhaust by supplying water into the pump and rotating a bladed wheel arranged in a casing. The vacuum nozzle 16 is connected to the flexible hose 17a, a vacuum coupler 18 is connected to the opposite side of the flexible hose 17a, and the exhaust port of the vacuum bag 15 is arranged on the front end. The exhaust port is connected to the vacuum coupler 18 by a flexible hose 17b. Remaining air inside the vacuum bag 15 is exhausted by the vacuum pump 3.

Now, flow of the vacuum bag 15 is explained based on FIG. 2. FIG. 2 is a schematic plan view showing the entire apparatus of this invention. The composite material 13 is laid on the mold form at a bagging site, placed into the vacuum bag 15, and is vacuumed preliminarily. This is referred to as a bagging step. The vacuum bag 15 which is vacuumed preliminarily is placed at a start position of the automatic conveying line 5. Then the predetermined temperature, pressure and time are set on the control panel 4. Automatic conveyance is started by pressing an automatic conveyance start button.

The vacuum bag 15 flows from left to right in FIG. 2. When the vacuum bag 15 reaches a stage in front of the molding chamber 1, it stops temporarily. The stage which is integrated with the door 19 is moved into the molding chamber 1 by the door opening/closing device 20 with the vacuum bag 15 placed on the stage. The molding chamber 1 is then closed tightly with the door 19. When the vacuum bag 15 reaches a predetermined position, it is connected to the vacuum nozzle 16 by the vacuum coupler 18, and vacuuming is started. This is referred to as a step of installation in a molding chamber. The molding process will be explained later. The vacuum bag 15 after finishing an exhaust and cooling step is carried out of the molding chamber 1, moved rightward by the automatic conveying line 5, and carried into the drying chamber 2. This is referred to as a step of installation in a drying chamber. Then the vacuum bag 15 is dried in the drying chamber 2, which is a drying step. After finishing the drying step, the vacuum bag 15 is moved rightward again by the automatic conveying line 5, and stopped at a stop position. The vacuum bag 15 is carried to a releasing site, where the vacuum bag 15 is removed and the molded product is released from the form. This is referred to as a releasing step.

In this embodiment, the vacuum bag 15 is dried in the drying chamber 2. However, the surrounding area of the vacuum bag 15 in the molding chamber 1 may be dried by vacuuming. In this case, the need for the drying chamber 2 is eliminated.

Figure 3:
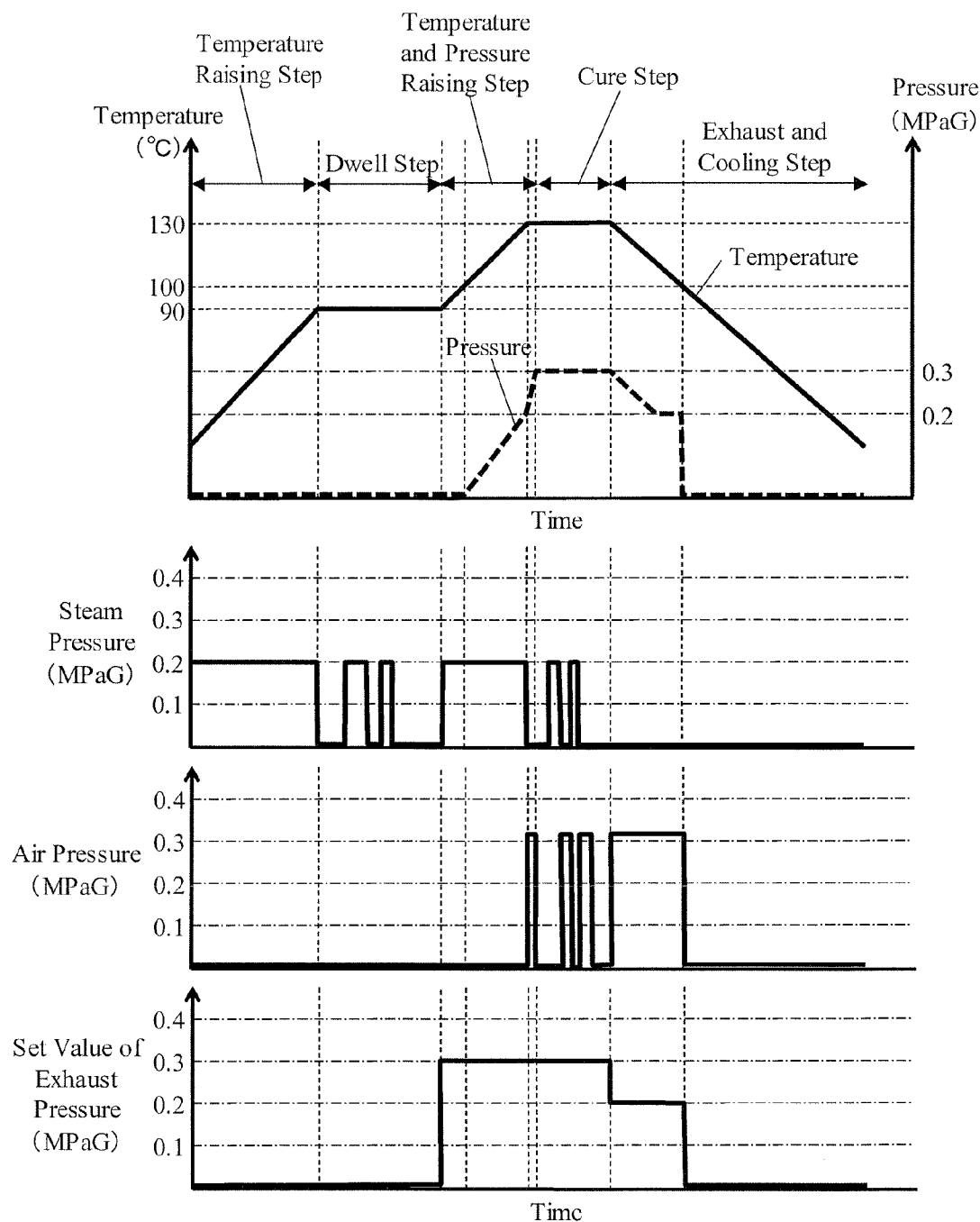
FIG. 3 is a pattern graph for controlling the temperature and the pressure of the autoclave apparatus of the Embodiment 1 over the time course.
Figure 4:
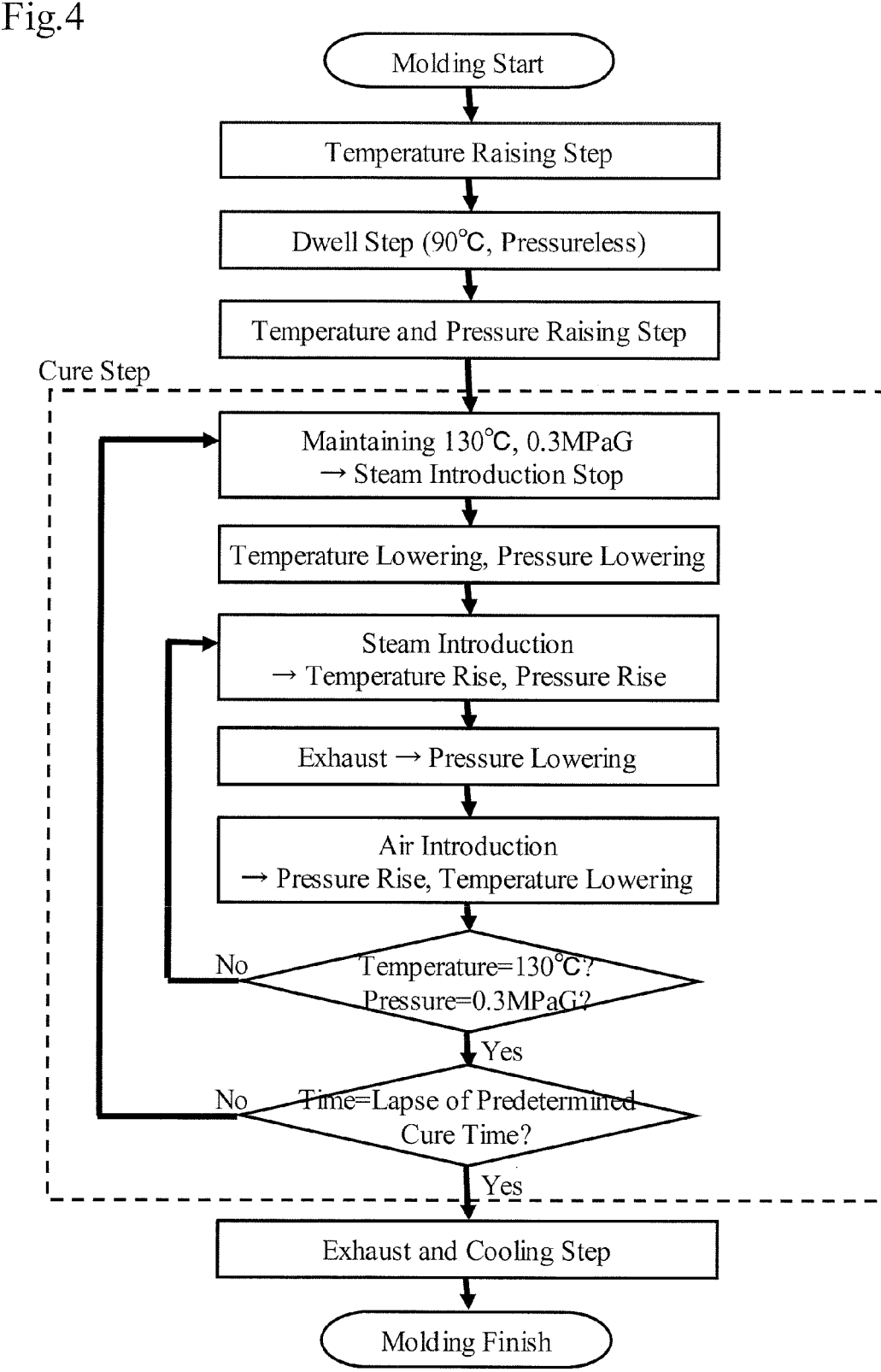
FIG. 4 is a flow chart showing the process of the molding method of the Embodiment 1.

Now, an example of an autoclave molding process is explained based on FIGS. 3 and 4. FIG. 3 shows a pattern graph for controlling the temperature and the pressure over the time course, and shows charts of a saturated steam pressure, a compressed air pressure and an exhaust air pressure varying in synchronization with the course of the pattern graph. A vertical axis of each of the charts shows a gauge pressure, namely, differential pressure to the atmospheric pressure. FIG. 4 shows a flowchart of the molding process.

Saturated steam of an original pressure of 0.4 MPaG and a temperature of 150° C. is prepared by the boiler 6 in advance, and the pressure is reduced to 0.2 MPaG by the pressure reduction valve 23. Quantity of the steam is controlled by the automatic main steam valve 24, and the automatic drainage valve 31 is opened to introduce the saturated steam into the molding chamber 1 under no pressure, namely, under the atmospheric pressure. Then the inside of the molding chamber 1 is heated to 90° C. This step is referred as a temperature raising step.

Then, the temperature of 90° C. is maintained for 1 to 1.5 hours by appropriately opening and closing the automatic temperature control valve 25 and by exhaust by opening of the automatic drainage valve 31. This is referred to as a dwell step.

Next, the automatic drainage valve 31 is closed once and the exhaust pressure is set at 0.3 MPaG. When the pressure inside the molding chamber 1 is 0.295 MPaG or lower, the automatic drainage valve 31 is kept closed. When the pressure becomes 0.305 MPaG or higher, the automatic drainage valve 31 is opened. When the pressure goes down to 0.295 MPaG or lower again, the automatic drainage valve 31 is closed. The temperature and pressure are controlled so that the ambient temperature in the molding chamber 1 may be 130° C. and the pressure 0.3 MPaG as target values for curing. The automatic main steam valve 24 operates again, and the saturated steam is introduced and heated to 130° C. The inside of the molding chamber 1 is pressureless, namely, under the atmospheric pressure, at 100° C. or lower. When the temperature exceeds 100° C., the pressure inside the molding chamber 1 increases toward 0.2 MPaG, which is the saturated steam pressure at the time of 130° C.

When the ambient temperature inside the molding chamber 1 reaches 130° C., the compressed air having the pressure of a little bit higher than 0.3 MPaG, namely, 0.31 MPaG for example, is introduced. This is because the air is not allowed to enter the molding chamber 1 when the pressure of the compressed air is lower than the pressure inside the molding chamber 1. The pressure of the compressed air is determined by the capacity of the compressor 28 like in the case of the saturated steam. For example, the compressed air of 0.6 MPaG is supplied from the compressor 28 to the air pipe 27, and the pressure is reduced to 0.31 MPaG by the pressure reduction valve 29. Shortage of pressure in the molding chamber 1 is supplemented by the compressed air, and the pressure inside the molding chamber 1 reaches 0.3 MPaG in due course. This is referred to as a pressure raising process.

The ambient temperature and the pressure inside the molding chamber 1 are respectively maintained at 130° C. and 0.3 MPaG, and the state is maintained for a predetermined curing time. The curing time is determined by the composite material 13. For example, in the case of the ordinary composite material 13 having the thermosetting resin as a substrate in this embodiment, it takes about 1 hour to complete the curing reaction. However, the temperature in the molding chamber 1 is lowered by heat absorption by the introduced air, heat absorption of the molding object, namely, the composite material 13 or the molding chamber 1, and heat release from the molding chamber 1 when no measures are taken. Therefore, steam needs to be introduced appropriately. When the pressure in the molding chamber 1 is lowered and the temperature there reaches 130° C., the air needs to be introduced.

When the temperature and the pressure in the molding chamber 1 are 130° C. and 0.3 MPaG, respectively, introduction of the steam and the air is stopped once, and the temperature and the pressure in the molding chamber 1 are lowered as the time passes for the above-mentioned reasons. Basically, lowering of the temperature is compensated by introduction of the steam, and lowering of the pressure is compensated by introduction of the air. When the steam is introduced again, the temperature and the pressure in the molding chamber 1 are raised, and when they exceed the set values of the conditions for exhaust, the automatic drainage valve 31 opens and the pressure lowers. When the temperature in the molding chamber 1 is 130° C., the steam can not be introduced, and therefore the air is introduced. Then the pressure in the molding chamber 1 is raised again, and the temperature is lowered. The temperature and the pressure in the molding chamber 1 are checked again, and when they are found to be different from 130° C. and 0.3 MPaG, respectively, the steam is introduced again. Thus, the temperature and the pressure in the molding chamber 1 are made balanced by supplying and exhausting the steam and the air, and the process is repeated until the time required for curing expires. This is referred to as a curing step.

When the curing step is finished, the set value of the automatic drainage valve 31 is set at 0.2 MPaG and the automatic drainage valve 31 is controlled. Then the air is introduced from the compressor 28 to replace the air. When the temperature in the molding chamber 1 lowers to 100° C. or below, the automatic drainage valve 31 is opened to the atmosphere, and the compressed air in the molding chamber 1 is discharged in a single burst. At the same time, the cooling water is discharged from the cooling nozzles 9 to cool the vacuum bag 15. The cooling water flowing to the bottom of the molding chamber 1 is exhausted to the drainage tank through the automatic drainage valve 31. This is called an exhaust and cooling step.

Figure 5:
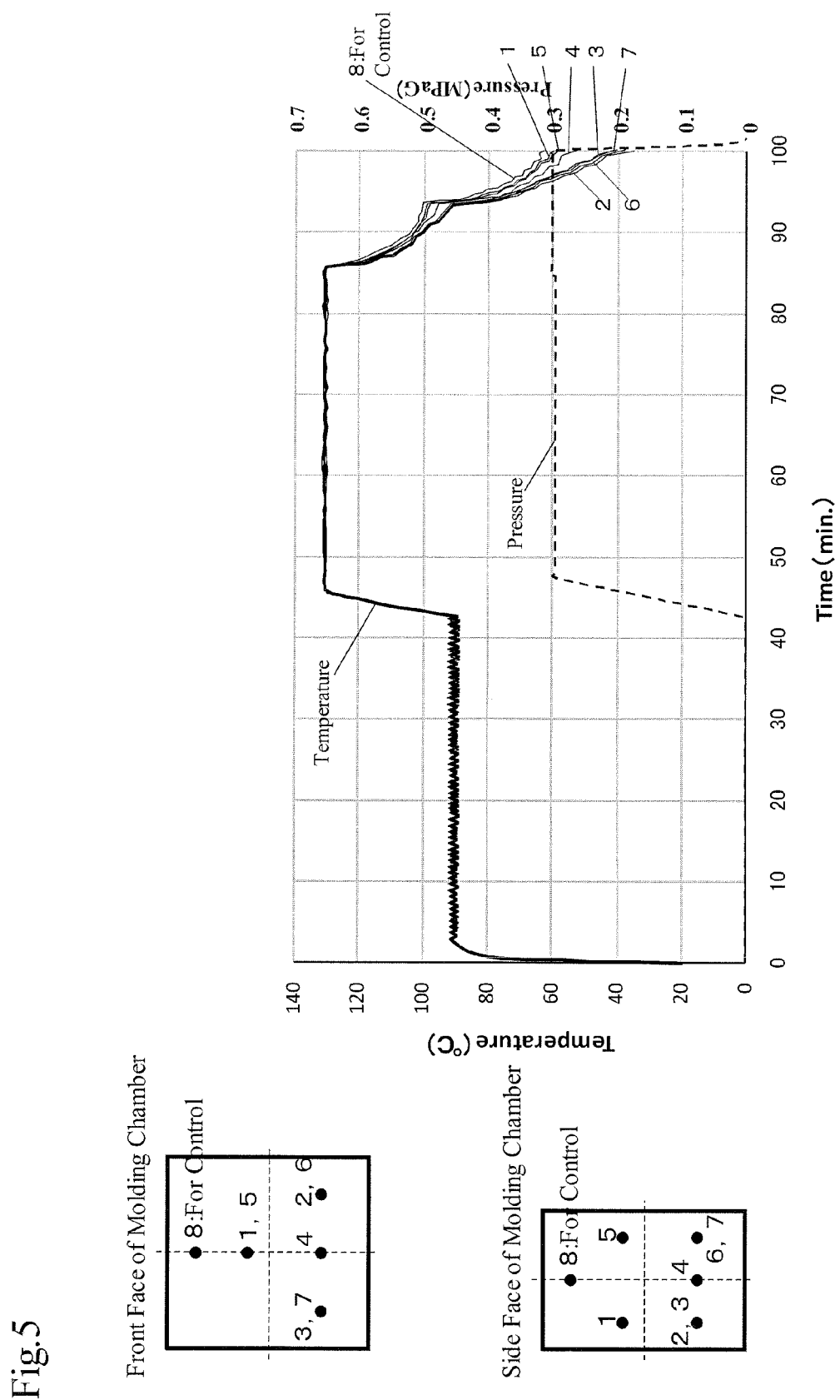
FIG. 5 is a graph showing the changes of an ambient temperature and pressure inside the molding chamber of the autoclave apparatus of the Embodiment 1 over the time course.

FIG. 5 is a graph showing the changes of the ambient temperature and the pressure inside the molding chamber 1 over the time course. As shown in FIG. 5, temperature sensors numbered one to eight are arranged in the molding chamber 1, and the ambient temperature is recorded by the eight temperature sensors. The temperature sensor numbered eight works as a sensor for controlling the temperature. The pressure is recorded by a pressure sensor which is not shown in the drawing.

The above-mentioned graph shows the data recorded upon molding under the temperature of 130° C., pressure of 0.3 MPaG, and curing time of 40 minutes, as curing conditions.

As to the temperature distribution at the ambient temperature of 130° C. in the curing step, variation of the recorded data by the eight temperature sensors is within 2° C., which indicates that the temperature variation in the molding chamber is very small. The higher the pressure is, the smaller the temperature variation is, since the number of gas molecules increases and thermal conductivity becomes higher.

The temperature distribution is also related to the curing time. To be exact, from the time the temperature sensor arranged at the position where the temperature is the lowest reaches the target temperature of 130° C., measurement of the curing time starts. Therefore, the smaller the temperature variation is, the smaller the time lag for reaching 130° C. between the position of the highest temperature and the position of the lowest temperature is. Consequently, the entire time for the curing step, or in other words, the substantive curing time is shortened.

In this embodiment, the vacuum bag 15 housing the composite material 13 is automatically conveyed. However, it may be carried manually.

Further, the valves are automatically controlled in this embodiment, but they may be controlled manually according to the operational procedures.

In a nutshell, the autoclave molding method of this invention is to mold the composite material, which comprises the fiber substrate and the matrix resin, by placing the composite material in the vacuum bag and then in the molding chamber, heating it, and pressurizing it. In this method, as the heat source and the predetermined pressurization source, the saturated steam having the predetermined temperature needed for molding the composite material is supplied to the molding chamber. Further, as the supplemental pressurization source needed for molding, the air, nitrogen or mixed gas of these having the predetermined pressure is supplied to the molding chamber when the need arises. Supply of the saturated steam, and the air, nitrogen or the mixed gas having the predetermined pressure is controlled so that the predetermined temperature and the predetermined pressure in the molding chamber needed for the composite material may be maintained to carry out the curing step.

In the above-mentioned method, following procedure is preferable. Namely, only the saturated steam is supplied with the molding chamber 1 partly opened. After the molding chamber 1 is heated to the predetermined temperature, the state is maintained for a predetermined time, which is the dwell step. Next, the molding chamber 1 is tightly closed, and the saturated steam and the air, nitrogen or the mixed gas of these having a predetermined pressure are supplied. Then, the process is shifted from the pressure raising step to the curing step. The dwell step, the pressure raising step and the curing step can be consecutively and easily carried out by controlling the saturated steam and the air, nitrogen or the mixed gas of these having the predetermined pressure all together.

Further, the following is the preferable procedure. Namely, after the curing step of the thermosetting resin is finished, cooling water is supplied into the molding chamber 1 to cool the composite material 13. Then the composite material 13 is transferred to the drying chamber 2 and the air is supplied thereto for drying. After that, the vacuum bag 15 is released from the composite material 13. Thus, since the composite material 13 is housed in the vacuum bag 15, direct cooling by the cooling water can be carried out immediately, and drying can also be carried out by hot wind.

(Example of Modification 1)

The above-mentioned Embodiment 1 is partially modified to present another form of embodiment, which is described below.

Figure 6:
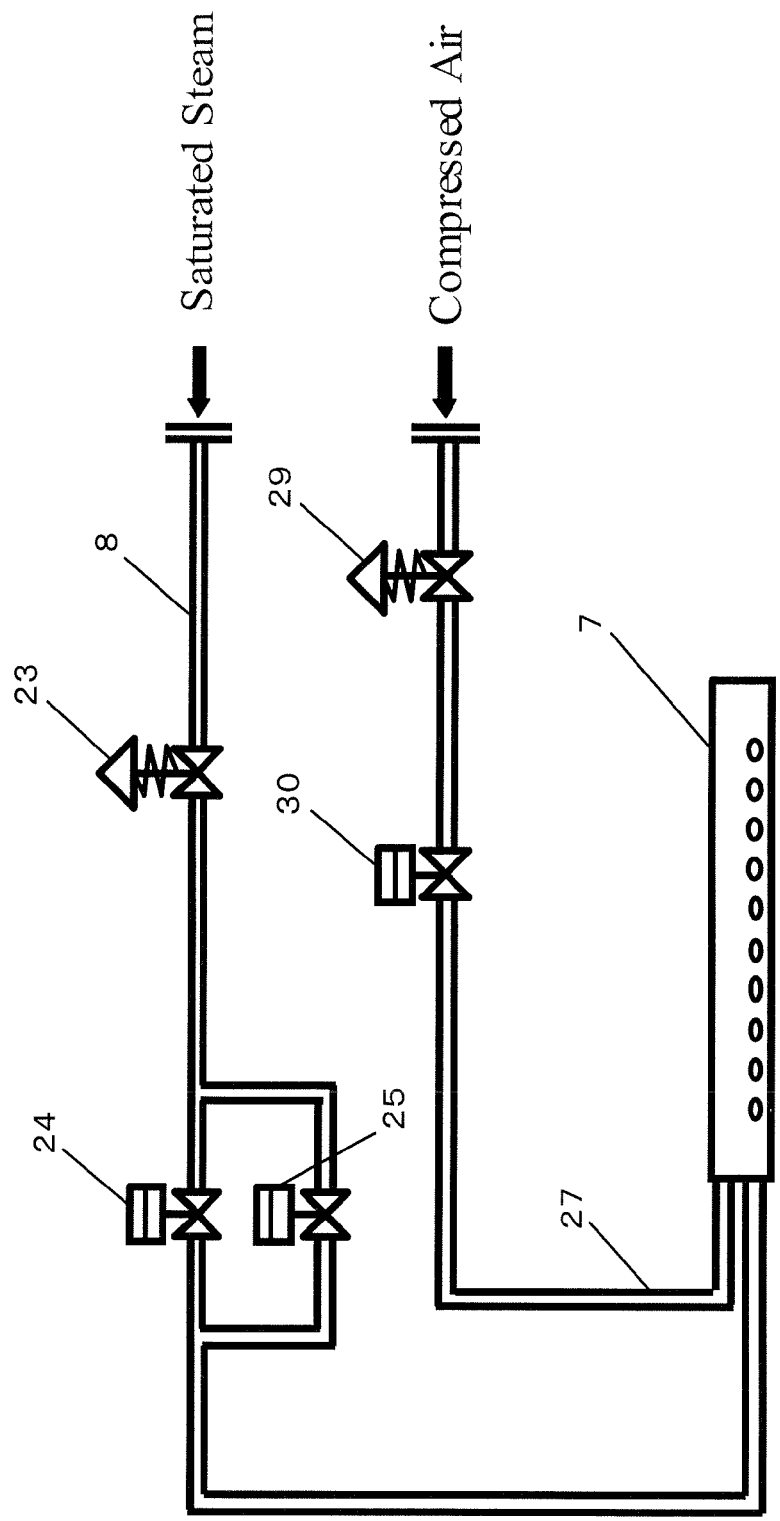
FIG. 6 is a schematic view of air nozzles showing another form of the main part of the autoclave apparatus of the Embodiment 1.

FIG. 6 shows a schematic view of an air nozzle showing another form of the main part of the autoclave apparatus of this invention. A plurality of nozzles 7 for supplying saturated steam into the molding chamber 1 serve also as a nozzle 11 for supplying compressed air, which is arranged in an upper part of the molding chamber 1 in the above-mentioned embodiment. Accordingly, the compressed air is showered down on the vacuum bag 15 in the similar form as the saturated steam showered down on the vacuum bag 15, and local pressure variation to the composite material 13, namely, the product to be molded is reduced. Thus, a stable molded product having no processing variation can be manufactured.

In FIG. 6, where the codes of members are not explained, refer to the explanation of the afore-mentioned Embodiment 1.

(Example of Modification 2)

Rapid curing prepreg can be molded by the method and the apparatus of this invention. The rapid curing prepreg as the composite material 13 comprises a thermosetting resin as the matrix which reacts and cures in a short time. The rapid curing prepreg may be, for example, Tough-Qure (a trade name) manufactured by Mitsubishi Rayon Co., Ltd. In this occasion, the reactive curing time is 30 minutes at 130° C., while it is 1 hour at 130° C. in the case of ordinary prepreg. In addition, since the saturated steam used here has a large quantity of heat, temperature variation is reduced, the substantive curing time is shortened, and productivity is obviously improved. The shorter the curing time is, the smaller the thrown heat energy is, and therefore the energy is saved. An advantage of the rapid cure property can be maximized by the reduction of the temperature variation.

Embodiment 2

The above-mentioned Embodiment 1 is a molding example in which the curing temperature condition is the temperature of the saturated steam, and the curing pressure condition is higher than that of the saturated steam.

When molding is performed under the condition of the curing pressure same as the pressure of the saturated steam, the air, nitrogen or the mixed gas of these having a predetermined pressure used as the supplemental pressurization source is not needed. Therefore, in this Embodiment 2, the need for the compressed air supplying means 33, which is arranged in the apparatus described in the Embodiment 1, is eliminated.

Figure 8:
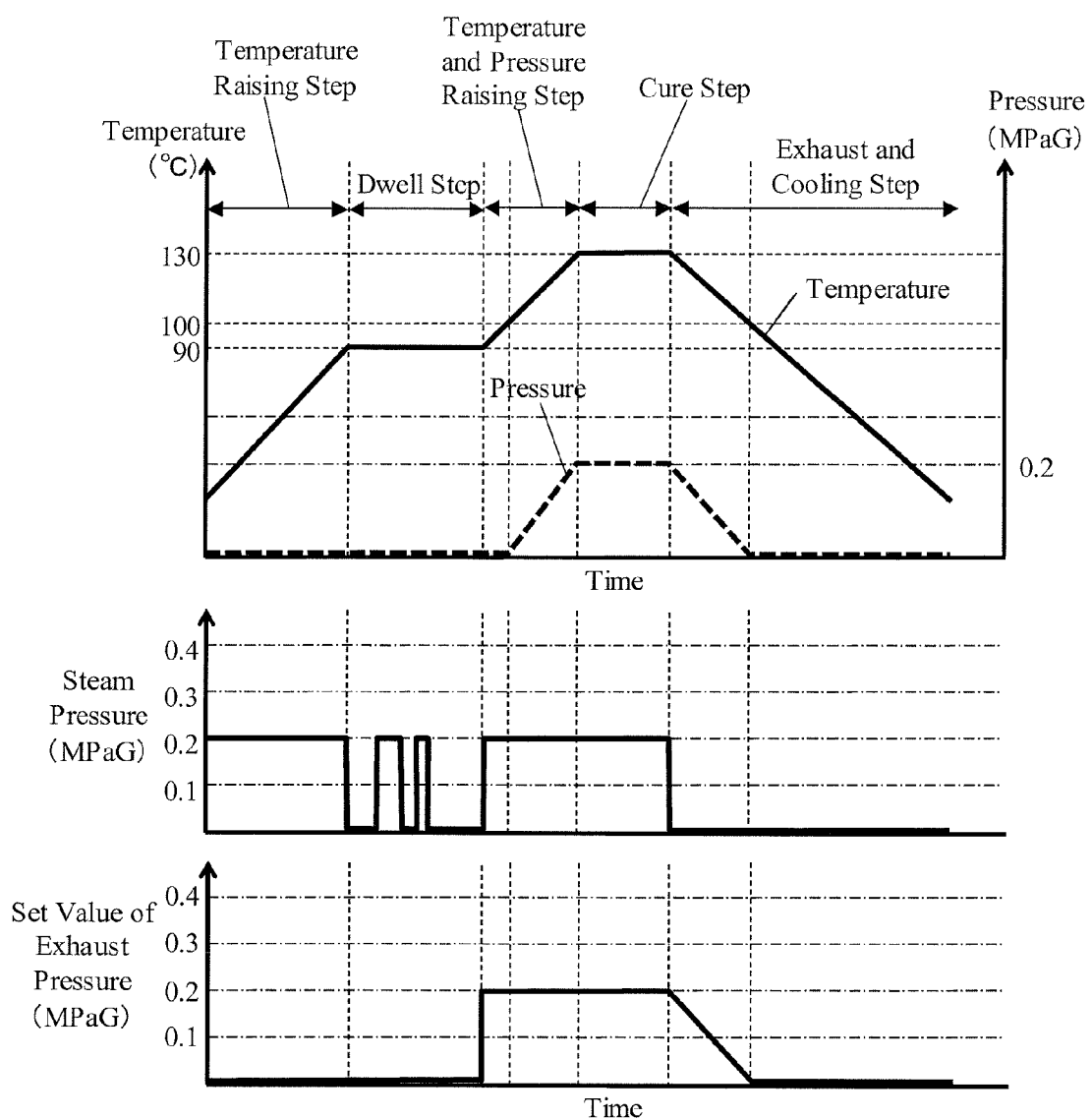
FIG. 8 is a pattern graph for controlling the temperature and pressure of the autoclave apparatus of the Embodiment 2 over the time course.
Figure 9:
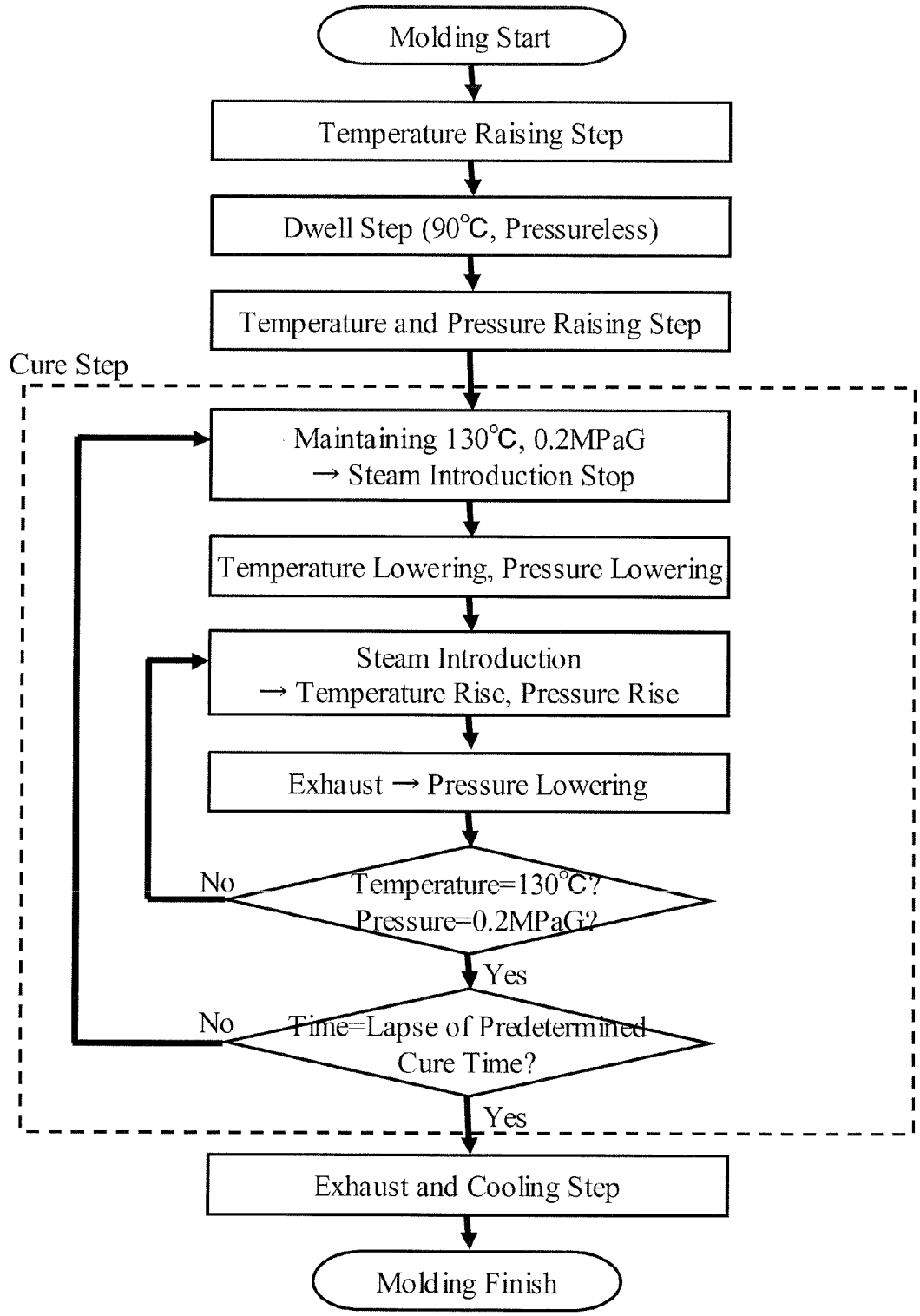
FIG. 9 is a flow chart showing a process of the molding method of the Embodiment 2.

Now, detailed explanation is given hereinafter based on FIGS. 8 and 9. FIG. 8 is a pattern graph for controlling the temperature and the pressure over the time course, and charts of pressure of the saturated steam and the exhaust moving in synchronization with the progress of the pattern graph. The vertical axis of each of the charts shows a gauge pressure, namely, a differential pressure to the atmospheric pressure. FIG. 9 is a flow chart showing the molding procedure.

The molding process is substantially same as that of the Embodiment 1. Explanation on the substantially same part is omitted here, and the parts which are different from the Embodiment 1 are explained below.

A composite material 13 prepared by impregnating a fiber substrate, namely, a carbon fiber as the matrix in this embodiment with the thermosetting resin, namely, an epoxy resin in this embodiment, is placed in the vacuum bag 15, which is then placed in the molding chamber 1, and is heated and pressurized for molding. In detail, the molding process is carried out using the saturated steam supplying means 32 as the heat source and the predetermined pressurization source, and the control means 34. The saturated steam supplying means 32 supplies the saturated steam of the predetermined temperature needed for the composite material 13, which is 130° C. in this embodiment. The control means 34 controls supply to the molding chamber 1 the saturated steam to maintain the predetermined temperature which is 130° C. in this embodiment, and the predetermined pressure which is 0.2 MPaG in this embodiment, which are needed for the composite material 13.

In the above-mentioned Embodiment 1, the air pressure is controlled based on the control chart of the air pressure shown in FIG. 3, however, a chart like this is not needed in this Embodiment 2.

The molding process is as follows. Namely, saturated steam having an original pressure of 0.4 MPaG and a temperature of 150° C. is prepared by the boiler 6, and the pressure is reduced to 0.2 MPaG by the pressure reduction valve 23. The steam quantity is controlled by the automatic main steam valve 24. The automatic drainage valve 31 is opened, and the saturated steam is introduced into the molding chamber 1 under no pressure, namely, under the atmospheric pressure. The temperature is raised to 90° C. This is the temperature raising step.

Next, the temperature of 90° C. is maintained for 1 to 1.5 hours by exhaust by appropriately opening and closing the automatic temperature control valve 25, and by opening the automatic drainage valve 31. This is the dwell step.

Then, the automatic drainage valve 31 is closed once and an exhaust pressure is set at 0.2 MPaG. When the pressure inside the molding chamber 1 is 0.195 MPaG or lower, the automatic drainage valve 31 is kept closed. When the pressure becomes 0.205 MPaG or higher, the automatic drainage valve 31 is opened. When the pressure becomes 0.195 MPaG or lower again, the automatic drainage valve 31 is closed. The target temperature and pressure as curing conditions are set so that the ambient temperature in the molding chamber 1 may be 130° C. and the pressure may be 0.2 MPaG. The automatic main steam valve 24 operates again, and the saturated steam is introduced to raise the temperature to 130° C. Inside the molding chamber 1 is pressureless, namely, under atmospheric pressure at 100° C. or lower. When the temperature exceeds 100° C., the pressure inside the molding chamber 1 is raised toward 0.2 MPaG, which is the saturated steam pressure at 130° C. This is the pressure raising process.

Then the ambient temperature in the molding chamber 1 is kept at 130° C. and the pressure at 0.2 MPaG, and the state is maintained for a predetermined curing time. As mentioned in the Embodiment 1, the curing time is determined by the composite material 13.

When the temperature is 130° C. and the pressure is 0.2 MPaG in the molding chamber 1, introduction of steam is stopped once. Then both of the temperature and the pressure in the molding chamber 1 lower as time elapses for the above-mentioned reasons. Basically, lowering in the temperature and in the pressure is supplemented by introduction of steam. When steam is introduced again, the temperature and the pressure in the molding chamber 1 are raised, and when they exceed the set values of the exhaust conditions, the automatic drainage valve 31 opens to lower the pressure. The temperature and the pressure in the molding chamber 1 are checked again and when they are found to be different from 130° C. and 0.2 MPaG, respectively, steam is introduced again. The temperature and the pressure in the molding chamber 1 are made balanced by supply and exhaust of steam. This operational process is repeated until the predetermined curing time expires. This is the curing step.

Explanation on the cooling step is omitted here since it is the same as that in the Embodiment 1.

Embodiment 3

Following is the description of the molding process on the condition that the curing pressure is lower than the saturated steam pressure. Where the structure is substantially same as that in the above-mentioned Embodiment 1, the relevant description is omitted in this description of the Embodiment 3.

Figure 10:
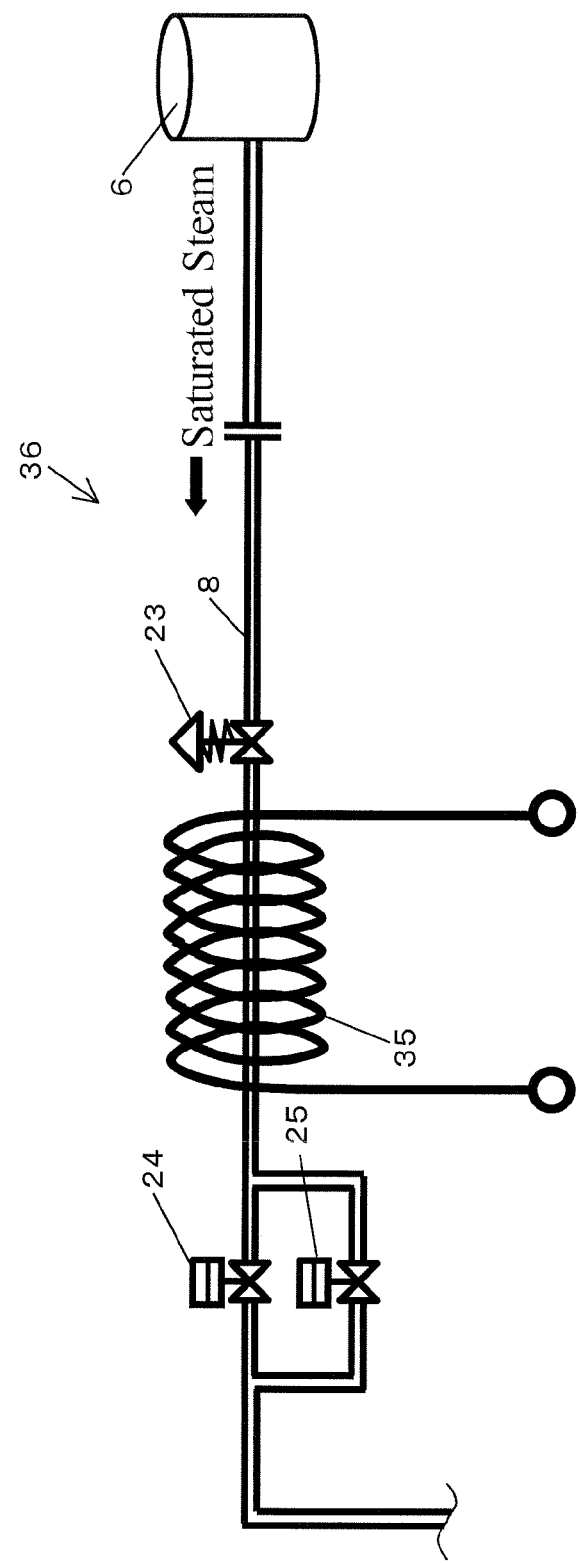
FIG. 10 is a schematic view of the superheated steam supplying means of the autoclave apparatus of the Embodiment 3 of this invention.

As shown in FIG. 10, the saturated steam heating means 35 is arranged to heat the saturated steam to turn it into superheated steam. The saturated steam corresponding to the pressure of the curing condition is heated by the saturated steam heating means 35 to turn it into superheated steam so that the temperature of the curing condition can be obtained.

The saturated steam heating means 35 is an electric heater in this embodiment, and is arranged on the steam pipe 8. Alternatively, the steam pipe 8 may be branched at the upstream side of the pressure reduction valve 23 and the branch is arranged in a manner of winding around the steam pipe 8 at the downstream side of the pressure reduction valve 23 so that superheating can be performed by heat exchange. Thus, the saturated steam after pressure reduction can be directly heated by the high-temperature saturated steam before pressure reduction.

In this embodiment, the air, nitrogen or the mixed gas of these having a predetermined pressure serving as a supplemental pressurization source is not needed, too. Therefore, the compressed air supplying means 33 arranged in the above-mentioned Embodiment 1 is eliminated. The molding process is equivalent to that of the Embodiment 2. In the meantime, a boiler generating superheated steam can be used instead of the boiler generating saturated steam. In this occasion, the above-mentioned saturated steam heating means is eliminated.

Figure 11:
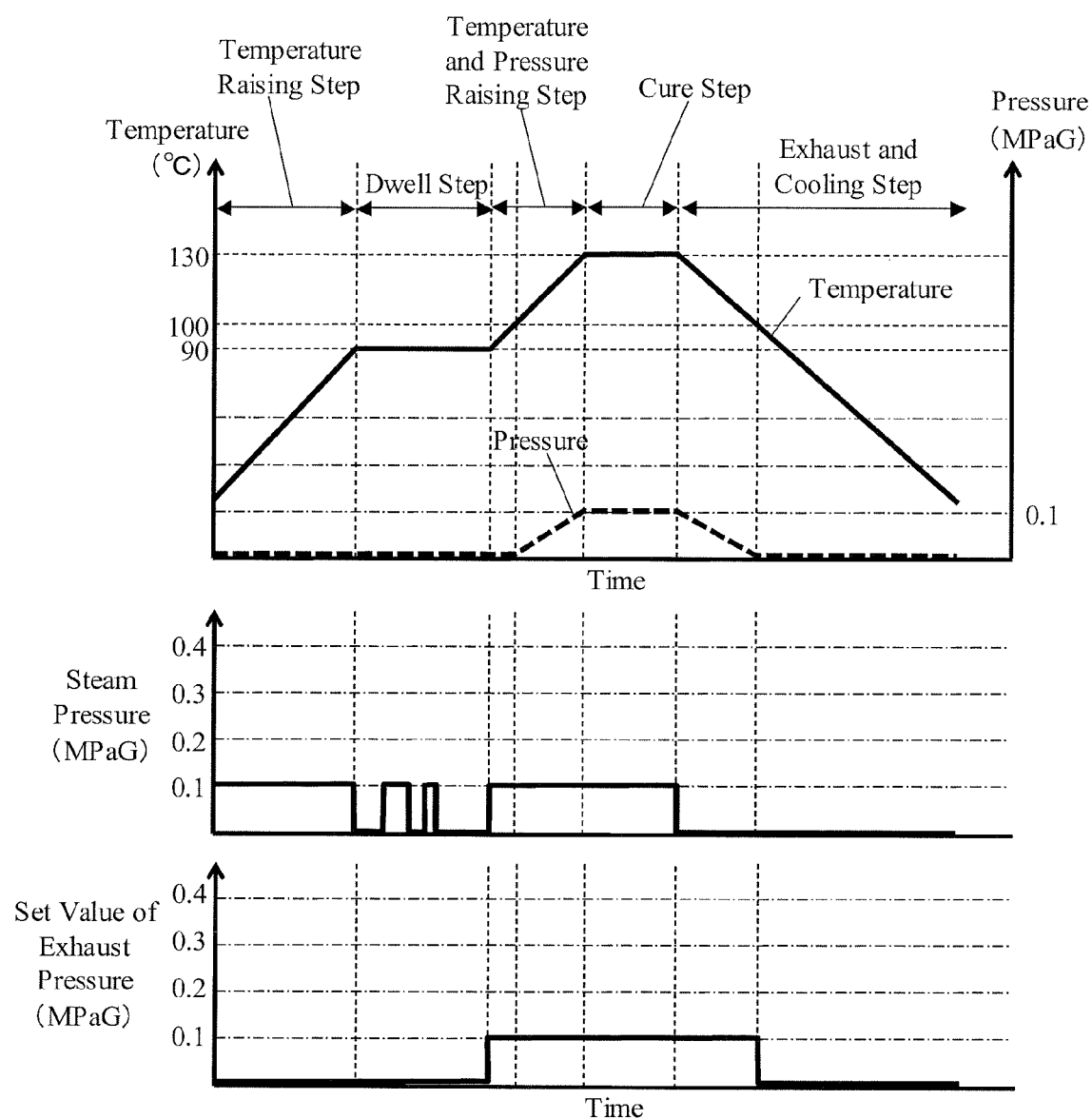
FIG. 11 is a pattern graph for controlling the temperature and pressure of the autoclave apparatus of the Embodiment 3 over the time course.
Figure 12:
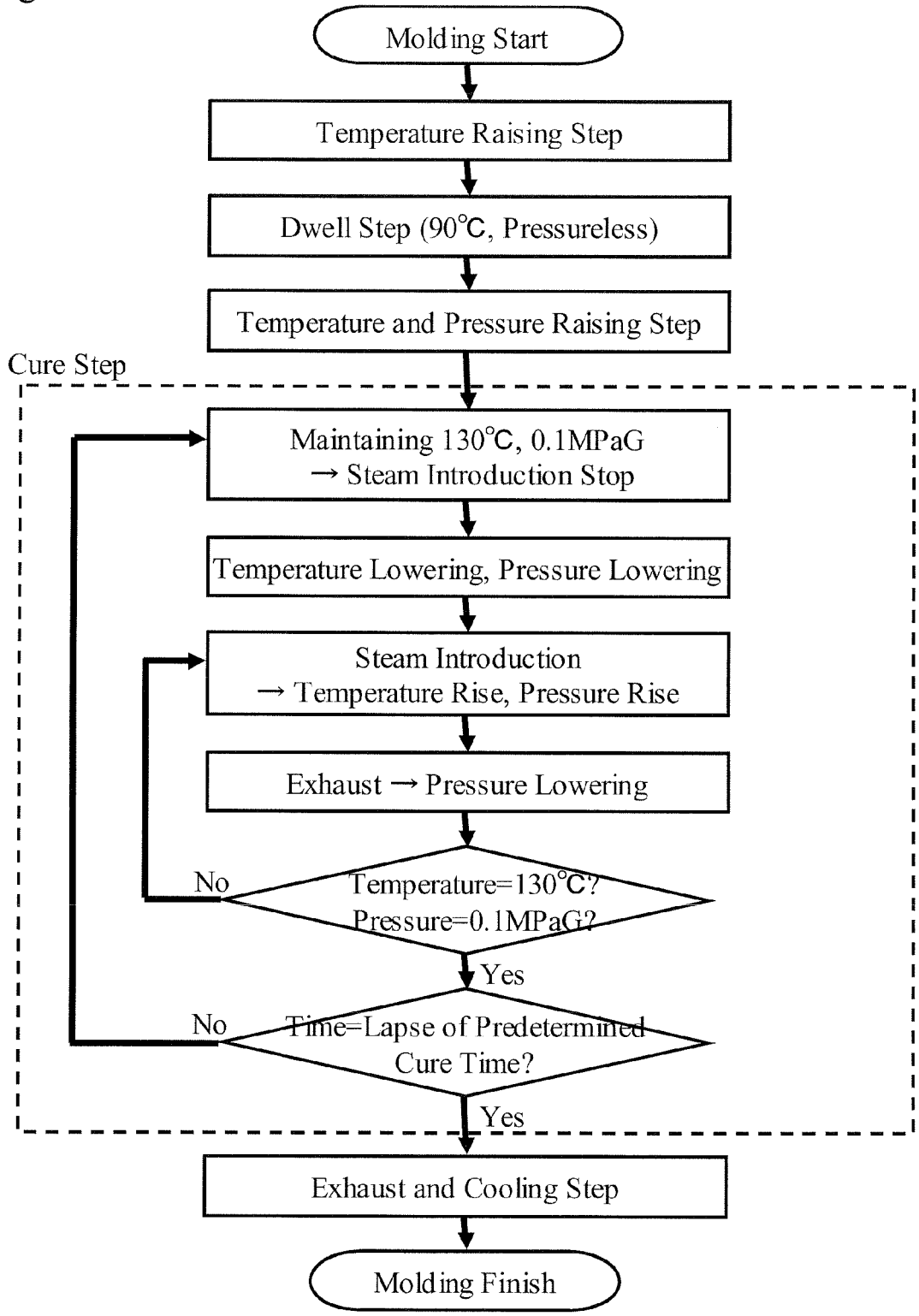
FIG. 12 is a flow chart showing the process of the molding method of the Embodiment 3 of this invention.

Following is the detailed explanation based on FIGS. 11 and 12. FIG. 11 shows a pattern graph for controlling the temperature and pressure of this Embodiment 3 over the time course, and charts showing the pressure of the superheated steam and the exhaust varying in synchronization with the time course of the pattern graph. A vertical axis of each of the charts indicates a gauge pressure, namely, a differential pressure to atmospheric pressure. FIG. 12 is a flow chart of the molding process.

The molding process is substantially same as that of the Embodiment 1. Explanation on the substantially same part is omitted here, and the parts which are different from the Embodiment 1 are explained below.

The composite material 13 obtained by impregnating a fiber substrate, namely, a carbon fiber in this embodiment, with a thermosetting resin, namely, an epoxy resin in this embodiment, as a matrix is placed in the vacuum bag 15, which is then placed in the molding chamber 1, heated and pressurized for molding. The molding process is carried out by the superheated steam supplying means 36 and the control means 34. The superheated steam supplying means 36 supplies to the molding chamber 1 the superheated steam having the predetermined temperature needed for the composite material 13, which is 130° C. in this embodiment, as the heat source and the predetermined pressurization source. The control means 34 controls the supply of the superheated steam to maintain the inside of the molding chamber 1 at the predetermined temperature and the predetermined pressure needed for the composite material 13, which are respectively 130° C. and 0.1 MPaG in this embodiment.

In the above-mentioned Embodiment 1, the air pressure is controlled based on the control chart of the air pressure as shown in FIG. 3, however, it is not needed in this embodiment.

Now, the molding process is described below. Saturated steam having the original pressure of 0.4 MPaG and the temperature of 150° C. is prepared in advance by the boiler 6, and the pressure is reduced to 0.1 MPaG and temperature to 120° C. by the pressure reduction valve 23. Then the saturated steam of 0.1 MPaG and 120° C. is heated to obtain the superheated steam of 0.1 MPaG and 130° C. The quantity of the steam is controlled by the automatic main steam valve 24. The automatic drainage valve 31 is opened, and the superheated steam is introduced into the molding chamber 1 under no pressure, namely, the atmospheric pressure. The temperature is raised to 90° C. This is the temperature raising step.

Next, the temperature of 90° C. is maintained for 1-1.5 hours by appropriate opening and closing of the automatic temperature control valve 25 and exhaust by opening the automatic drainage valve 31. This is the dwell step.

Then, the automatic drainage valve 31 is closed once and the exhaust pressure is set at 0.1 MPaG. When the inside of the molding chamber 1 is 0.095 MPaG or lower, the automatic drainage valve 31 is kept closed. When the inside of the molding chamber 1 becomes 0.105 MPaG or higher, the automatic drainage valve 31 is opened. When it drops to 0.095 MPaG or lower again, the automatic drainage valve 31 is closed. Target temperature and pressure as curing conditions are set so that the ambient temperature may be 130° C. and the pressure be 0.1 MPaG inside the molding chamber 1. The automatic main steam valve 24 operates again, and the superheated steam is introduced to raise the temperature to 130° C. Inside the molding chamber 1 is under no pressure, namely, under the atmospheric pressure, when the temperature is 100° C. or lower, and when it exceeds 100° C., the pressure inside the molding chamber 1 increases toward 0.1 MPaG, which is the predetermined pressure. This is the pressure raising step.

The ambient temperature and the pressure inside the molding chamber 1 are kept at 130° C. and 0.1 MPaG, respectively, and the state is maintained for the predetermined curing time. As mentioned in the Embodiment 1, the curing time is determined by the composite material 13.

When the temperature inside the molding chamber 1 is 130° C. and the pressure is 0.1 MPaG, introduction of the steam is stopped once. Then both of the temperature and the pressure in the molding chamber 1 lower as time elapses because of the above-mentioned reasons. Basically, the lowering of the temperature and the pressure is supplemented by introduction of the steam. When the steam is introduced again, the temperature and the pressure in the molding chamber 1 are raised. When the pressure exceeds the set value of the exhaust condition of 0.105 MPaG, the automatic drainage valve 31 opens and the pressure is lowered. When the pressure is 0.095 MPaG or lower, the automatic drainage valve 31 is closed. The temperature and the pressure in the molding chamber 1 are checked again, and when they are found to be different from 130° C. and 0.1 MPaG, respectively, the steam introduction step is resumed. The temperature and the pressure in the molding chamber 1 are made balanced by supply and exhaust of steam in this manner, and the operational process is repeated until the predetermined curing time expires. This is the curing step.

The cooling step is the same as that in the Embodiment 1 and so description thereof is omitted here.

Embodiment 4

Molding of the composite material 13 using a thermoplastic resin as the matrix is explained hereinafter based on FIG. 13.

Basically, since this embodiment is substantially the same as the above-mentioned Embodiment 1, description of the part same as that in the Embodiment 1 is omitted here.

The thermoplastic resin used as the matrix is a polypropylene resin in this embodiment. Alternatively, a polyamide resin, an ABS resin, etc. can also be used.

Figure 13:
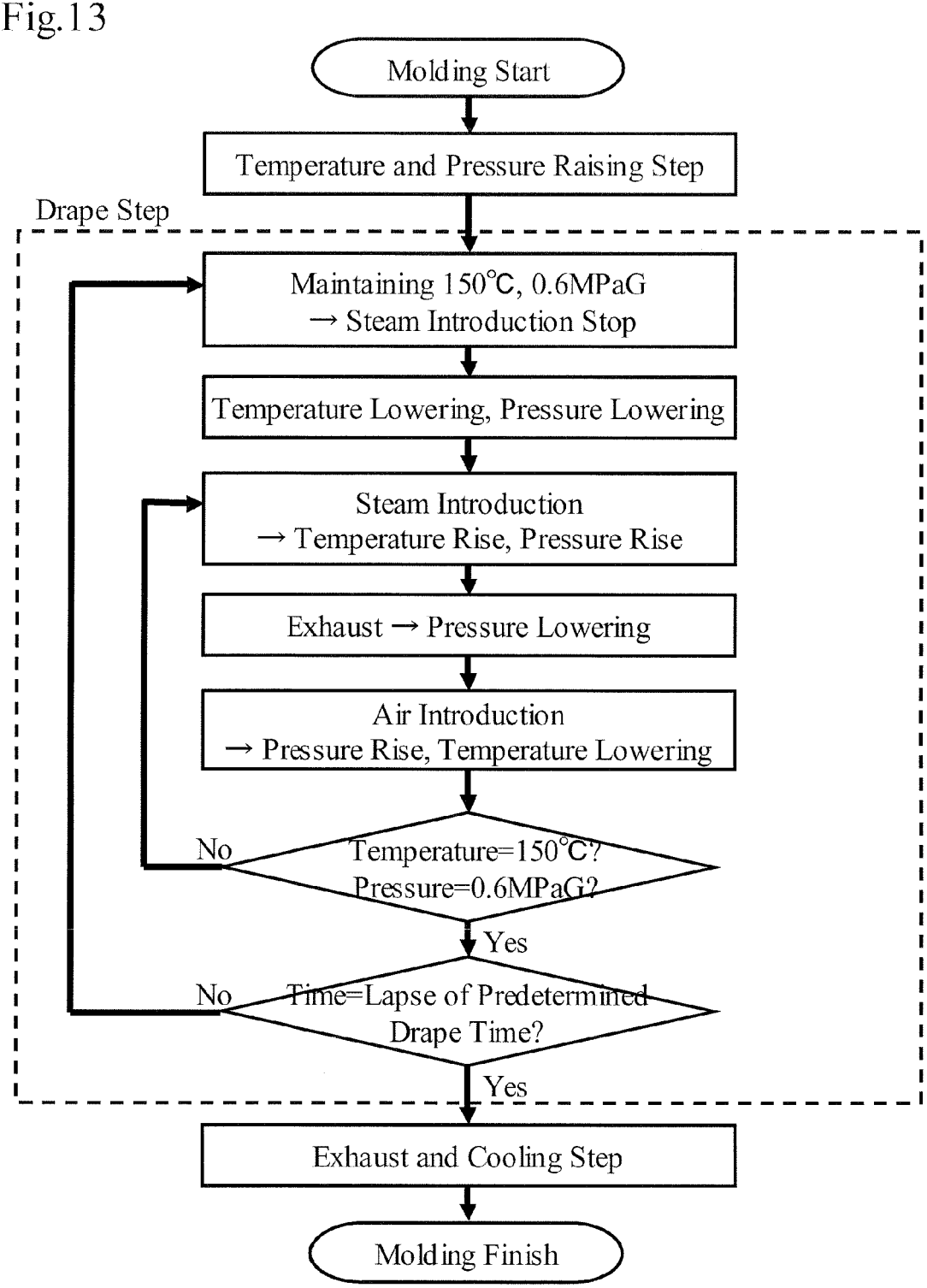
FIG. 13 is a flow chart showing the process of the molding method of the Embodiment 4.

FIG. 13 is a flow chart showing the molding process corresponding to the curing step shown in FIG. 4 in the Embodiment 1. The step is a forming step.

The process is shifted to the forming step from the temperature and pressure raising step performed by introducing saturated steam. The forming conditions are set at 150° C. and 0.6 MPaG, which are higher than those in the case of using the thermosetting resin.

When the conditions are not maintained, following control is performed. Namely, when the pressure rises as shown in the flow chart, for example, the pressure is lowered by exhaust. When the temperature rises, for example, the air is introduced to lower the temperature. When the pressure lowers, the air is introduced to restore the pressure.

Such control is explained specifically in the description of the Embodiment 1.

Forming of the thermoplastic resin is finished when the resin is softened. Therefore, the time needed before an exhaust and cooling step is shortened compared to the case of using the thermosetting resin.

In this sense, the process in this embodiment is not different from the process of a conventional autoclave molding using the thermoplastic resin. However, what is different is that the heat and pressurization source is steam, which has not been used in the technical field of autoclave molding of the composite material, and that the temperature and the pressure are controlled.

(Example for Comparison)

Figure 14:
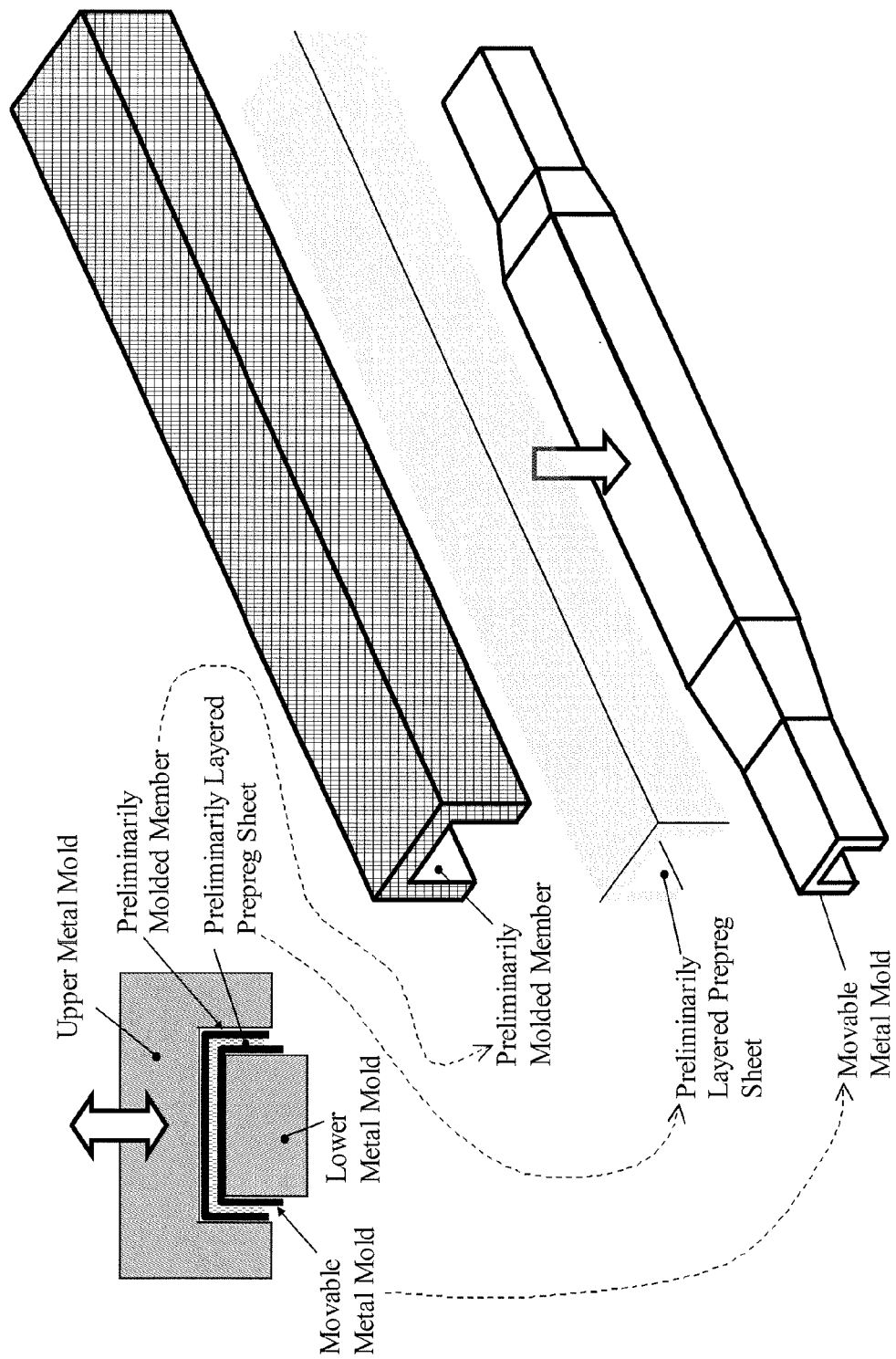
FIG. 14 is a schematic view of the conventional hot-press apparatus and of a specimen molded by the hot-press apparatus.
Figure 15:
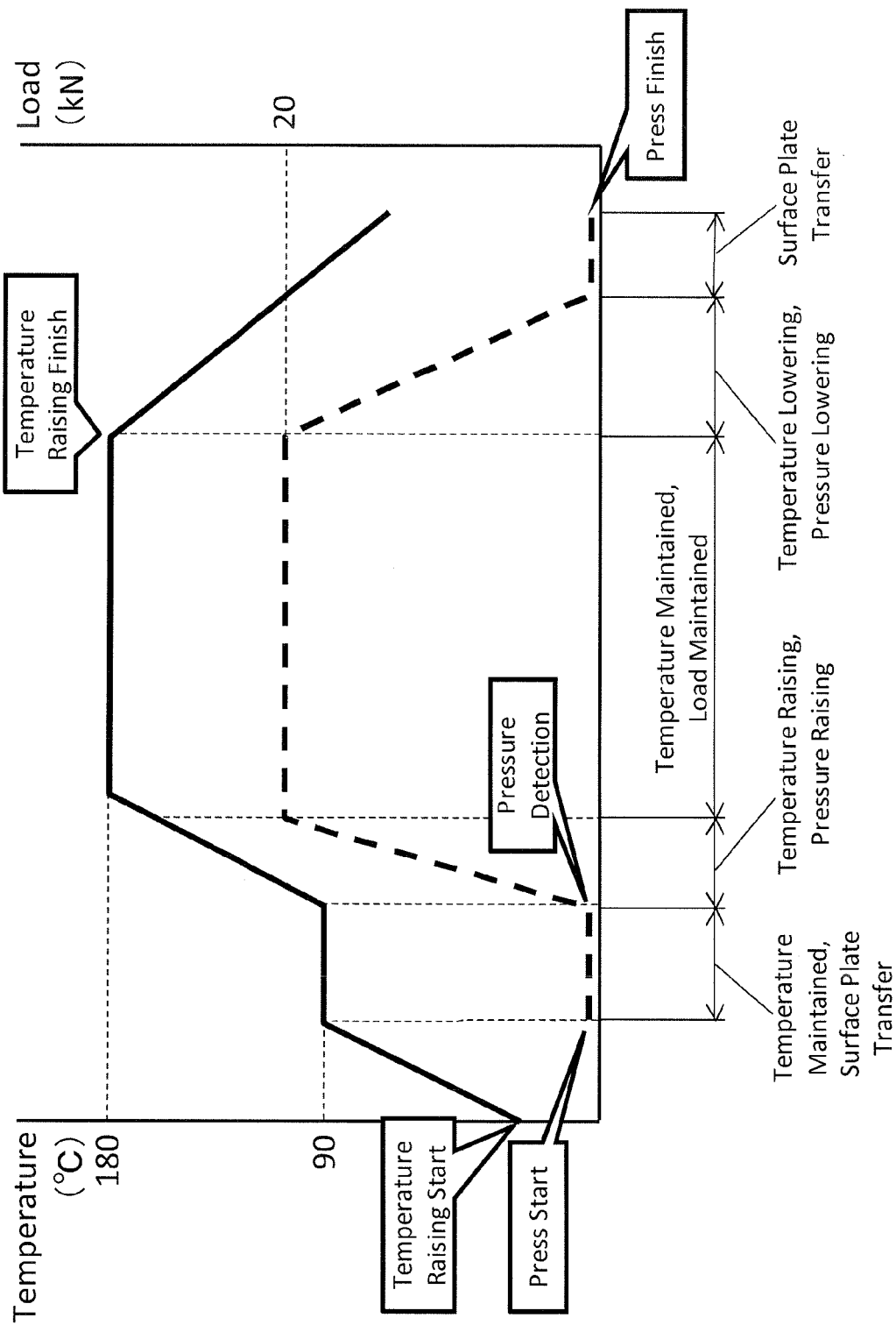
FIG. 15 is a pattern graph for controlling the temperature and pressure of the conventional hot-press apparatus over the time course.

First, a C-shaped material of a preliminarily molded member as shown in FIG. 14 is molded by a conventional hot-press apparatus under control of temperature and pressure as shown in FIG. 15.

According to this molding process, a sheet of prepreg is pulled out of a roll, and is allowed to go through the hot-press apparatus to form the C-shaped material having an even cross section.

Another C-shaped material of the same shape as mentioned above is formed by the method and apparatus of this invention based on the Embodiment 1. Specimens each having the width of 10 mm and the length of 80 mm are cut out from a side wall, namely, the side part parallel to the pressing direction of the hot-press apparatus, for example, of the C-shaped material. The specimens undergo a bending test according to K7171 of the Japanese Industrial Standard or JIS in short. All the conditions like the kind of the composite material and the number of layers of the composite material laid on the mold form are identical.

Three specimens A, B, C are prepared. To be specific, the specimen A is what is cut out from the C-shaped material molded by the method and apparatus of this invention as described in the Embodiment 1 under the conditions of the curing temperature of 130° C., the pressure of 0.2 MPaG, and the curing time of 1 hour. The specimen B is what is cut out from the C-shaped material molded by the same method and apparatus under the conditions of the curing temperature of 130° C., the pressure of 0.3 MPaG, and the curing time of 1 hour. The specimen C is what is cut out from the C-shaped material molded by the conventional hot-press apparatus under the conditions of the curing temperature of 130° C., the pressure of 0.3 MPaG, and the curing time of 1 hour.

Figure 7:
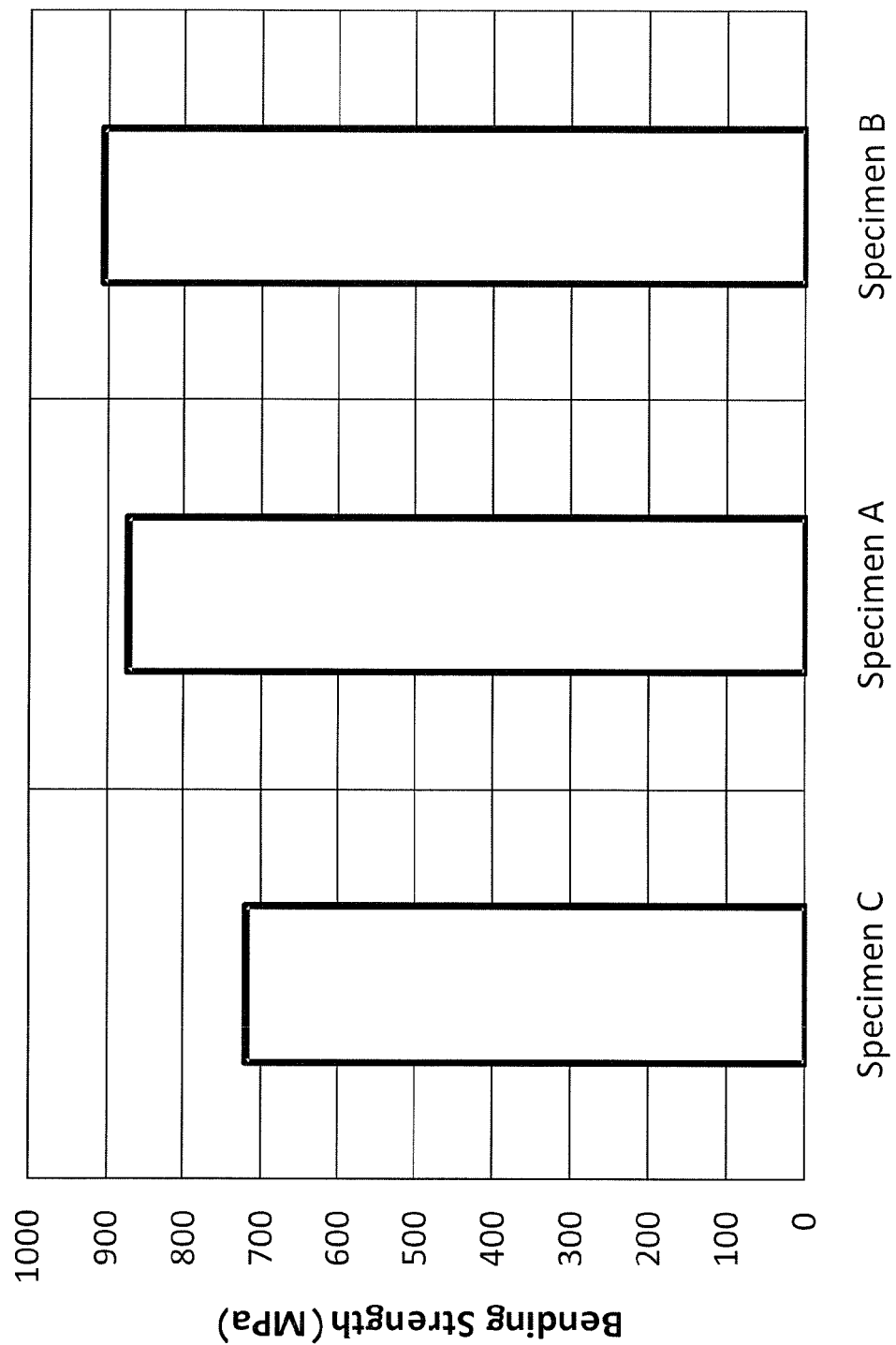
FIG. 7 is a graph showing comparison in bending strength of specimens molded by a conventional hot-press apparatus and by the method of this invention.

Each of the specimens has undergone a bending test, and a graph showing the comparison of the specimens in the bending strength is presented in FIG. 7.

The bending strength of the specimen C is found to be obviously inferior compared to the specimen B which has been prepared under the same curing conditions, since a surface pressure of the hot-press apparatus is not sufficiently applied. In the case of the method and apparatus of this invention, the pressure is applied equally to every face, as the molding is performed by using steam. It means that sufficient pressure has been applied to the specimen B while the surface pressure applied to the specimen C has been insufficient.

As seen from the comparison between the specimen A and the specimen B, the higher the pressure is, the larger the bending strength is. It is found that the pressure is an important factor to the strength of a molded product.

INDUSTRIAL APPLICATION POTENCY

According to this invention, the isotropic pressure can contribute to molding of the product of the composite material having an uneven and complicated cross sectional shape. Therefore, this invention contributes to assuring the strength of the composite material all over, to the improved productivity by selecting a material which can be cured in a shorter time, to the improved economic efficiency by simplifying the structure of the device and by selecting an inexpensive mold form, and to development of the industries where a composite material molded product having a complicated cross sectional shape is needed like an aircraft or an automobile by manufacturing a stable molded product having no manufacturing irregularity.

I claimed:

1. An autoclave molding method for molding a composite material formed of a fiber substrate and a matrix of a thermosetting resin or a thermoplastic resin by placing the composite material in a vacuum bag and then in a molding chamber, and the heating and pressurizing the composite material, the method comprising:
   a step of supplying into the molding chamber saturated steam having a predetermined temperature and pressure needed for the composite material as a heating source and a predetermined pressurization source,
   a step of supplying into the molding chamber air, nitrogen or mixed gas having an ambient temperature and having a predetermined pressure higher than the saturated steam pressure as a supplemental superimposed pressurization source needed for molding, and
   a step of curing by controlling supply of the saturated steam, and the air, nitrogen or the mixed gas of these having the predetermined pressure, and controlling at least the temperature or the pressure so that the inside of the molding chamber can be maintained at the predetermined temperature and pressure needed for the composite material.

* * * * *